United States Patent [19]

Ebcioglu et al.

[11] Patent Number: 5,542,075

[45] Date of Patent: Jul. 30, 1996

[54] METHOD AND APPARATUS FOR IMPROVING PERFORMANCE OF OUT OF SEQUENCE LOAD OPERATIONS IN A COMPUTER SYSTEM

[75] Inventors: Mahmut K. Ebcioglu, Somers; Eric P. Kronstadt, Katonah; Manoj Kumar, Yorktown Heights, all of N.Y.

[73] Assignee: International Business Machines Corporation, Armonk, N.Y.

[21] Appl. No.: 320,111

[22] Filed: Oct. 7, 1994

Related U.S. Application Data

[63] Continuation of Ser. No. 880,102, May 6, 1992.

[51] Int. Cl.[6] .............................. G06F 9/45; G06F 12/02; G06F 9/30; G06F 9/312
[52] U.S. Cl. .................. 395/700; 364/280.4; 364/280.5; 364/DIG. 1; 364/973; 364/DIG. 2; 395/800
[58] Field of Search .................................. 395/650, 700, 395/800

[56] References Cited

U.S. PATENT DOCUMENTS

| | | | |
|---|---|---|---|
| 4,471,433 | 9/1984 | Matsumoto et al. | 364/200 |
| 4,847,755 | 7/1989 | Morrison et al. | 364/200 |
| 4,991,090 | 2/1991 | Emma et al. | 364/200 |
| 5,173,872 | 12/1992 | Crawford et al. | 365/49 |
| 5,202,975 | 4/1993 | Rasbold et al. | 395/500 |

OTHER PUBLICATIONS

Alexandru Nicolau, "Run–Time Disambiguation: Coping with Statically Unpredictable Dependencies", A, May 1989; IEEE Transactions on Computers, vol. 38, No. 5, pp. 663–678.

H. T. Kung and John T. Robinson, "On Optimistic Methods for Concurrency Control", Jun. 1981; ACM Transactions on Database Systems, vol. 6, No. 2, pp. 213–226.

"Compleat C" by J. F. Peters, III et al, 1986 by Prentice-Hall, pp. 33, 37, and 55.

*Primary Examiner*—Kevin A. Kriess
*Assistant Examiner*—Michael T. Richey
*Attorney, Agent, or Firm*—Heslin & Rothenberg, P.C.

[57] ABSTRACT

The invention provides for improved performance of out of sequence load operations. The system has an improved compiler, with an optimizer, an improved CPU with four new instructions in its instruction set, and an address compare unit (ACU). During compilation, the improved compiler identifies load operations that can be move out of sequence ahead of associated store operations and moves those load operations out of sequence and flags them as such. The associated store operations are also flagged. During processor execution of a compiled and optimized program, the address of operands fetched by the out of sequence load operations are saved to the new associative memory. On request, the ACU compares the addresses saved to the addresses generated by the associated store operations. If a comparison results in an identity between the address of a store operation and an address of the out of sequence load operation, a recovery code is run to correct the problem, if not the system continues to execute the program in its compiled order. The system also has the ability to work in a multiprogramming or multitasking environment.

60 Claims, 15 Drawing Sheets

TRADITIONAL OPTIMIZER

```
NEED TO MOVE LOAD BEFORE
A BRANCH OPERATION
        |
        v
NO ACTION, EXCEPT
GENERATING SAFE CODE
```

*fig. 3a*

OPTIMIZER WITH ACU

```
NEED TO MOVE LOAD-SAVE
BEFORE A BRANCH OPERATION
        |
        v
ATTACH CLEAR-ACU INSTRUCTION TO THE TARGETS
OF THE BRANCH WHICH DID NOT HAVE THE LOAD-SAVE
INSTRUCTION INITIALLY IF A CLEAR-ACU INSTRUCTION
DOES NOT ALREADY EXIST AT THOSE TARGETS
        |
        v
INSERT "ACU REGISTER NO" BIT IN THE CLEAR-ACU
INSTRUCTION TO CLEAR THE ENTRY OF THE LOAD-SAVE
INSTRUCTION FROM THE BRANCHES WHICH DID NOT HAVE
THE LOAD-SAVE INSTRUCTION INITIALLY
        |
        v
      (END)
```

*fig. 3b*

THE ADDITIONS TO THE INSTRUCTION SET

THE LOAD-SAVE COMMAND:
LOAD_SAVE DEST_REG, ADDRESS, ACU_BUFFER_No$_n$

THE STORE-CHECK COMMAND:
STORE_CHECK DATA_REG, ADDRESS

THE CLEAR-ACU COMMAND:
CLEAR_ACU, ACU BUFFER_No$_1$,
ACU BUFFER_No$_2$, ACU BUFFER No$_n$

*fig. 4*

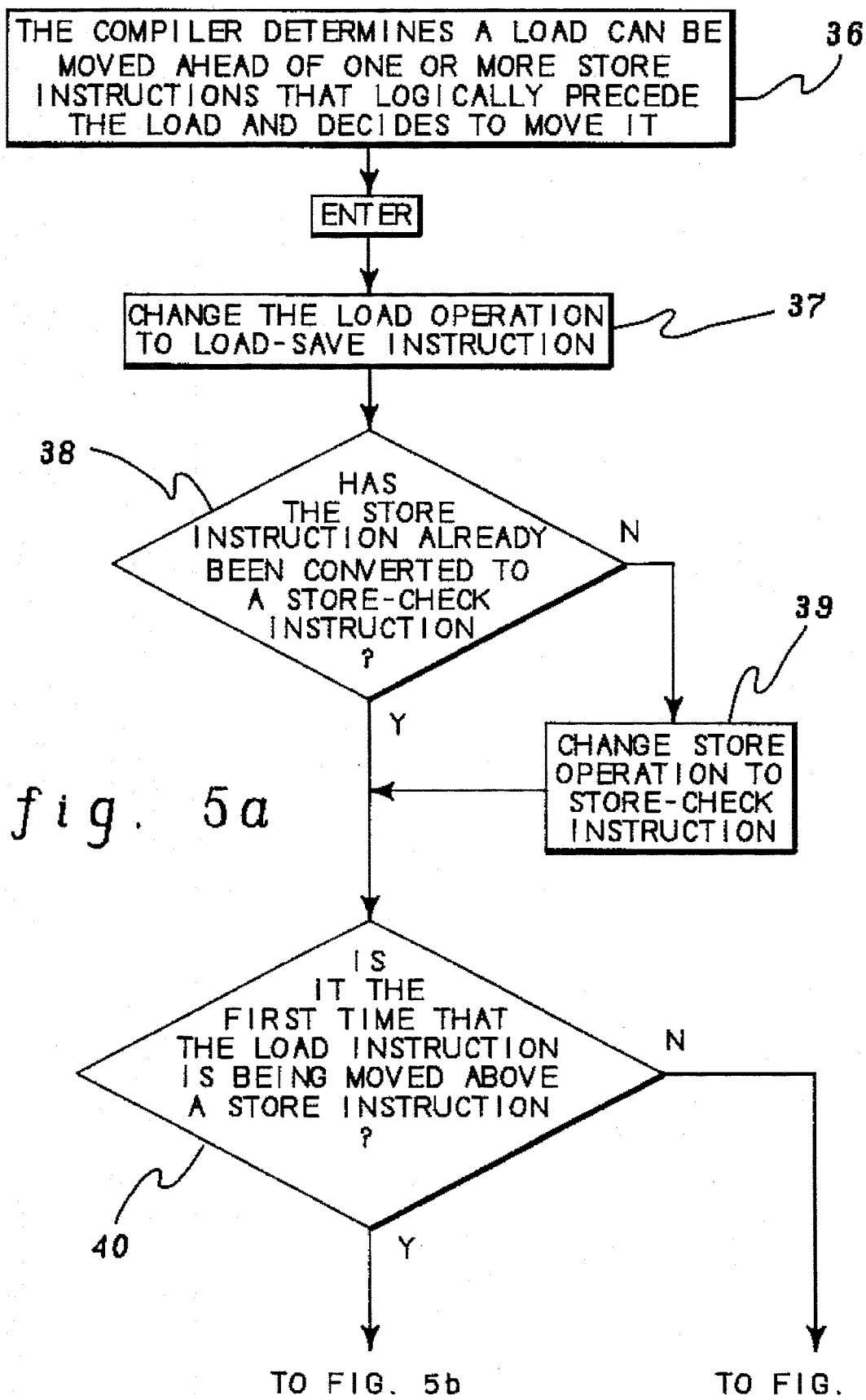

PROGRAM BEFORE COMPILATION
AS ORIGINALLY WRITTEN

INSTRUCTION

| | | |
|---|---|---|
| i1 | AR | R13, R15 |
| i2 | L | R13, 0 (R13) |
| i3 | ST | R1, 112 (R13) |
| i4 | L | R2, 18 (R12) |
| i5 | ST | R3, 116 (R13) |
| i6 | L | R4, 10 (R12) |
| i7 | SR | R2, R4 |
| i8 | AR | R2, R6 |

*fig. 6a*

COMPILED PROGRAM WITHOUT
USING OPTIMIZATION PROCESS

INSTRUCTION

| | | |
|---|---|---|
| 1 | AR | R13, R15 |
| 2 | L | R13, 0 (R13) |
| 3 | ST | R1, 112 (R13) |
| 4 | L | R2, 18 (R12) |
| 5 | ST | R3, 116 (R13) |
| 6 | L | R4, 10 (R12) |
| 7 | SR | R2, R4 |
| 8 | AR | R2, R6 |

*fig. 6b*

COMPILED PROGRAM USING OPTIMIZATION PROCESS

| INSTRUCTION | | |
|---|---|---|
| 1 | AR | R13, R15 |
| 2 | L-SAVE | R2, 18 (R12), 1 |
| 3 | L-SAVE | R4, 10 (R12), 2 |
| 4 | L | R13, 0 (R13) |
| 5 | SR | R2, R4 |
| 6 | ST-CHECK | R1, 112 (R13) |
| 7 | L1: | CLEAR_ACU1 |
| 8 | ST-CHECK | R13, 116 (R13) |
| 9 | L2: | CLEAR_ACU2 |
| 10 | AR | R2, R6 |

*fig. 6c*

RECOVERY CODE FOR COMPILED PROGRAM USING OPTIMIZATION PROCESS

/*RECOVERY CODE FOR ST-CHECK R1, 112 (R13)*/

| INSTRUCTION | | |
|---|---|---|
| 1 | ST_ | R1, 112 (R13) |
| 2 | L | R2, 18 (R12) |
| 3 | L | R4, 10 (R12) |
| 4 | SR | R2, R4 |
| 5 | GO TO L1. | |

/*RECOVERY CODE FOR STORE-CHECK R3, 116 (R13)*/

| INSTRUCTION | | |
|---|---|---|
| 1 | ST | R3, 116 (R13) |
| 2 | L | R4, 10 (R12) |
| 3 | SR | R2, R4 |
| 4 | GO TO L2. | |

*fig. 6d*

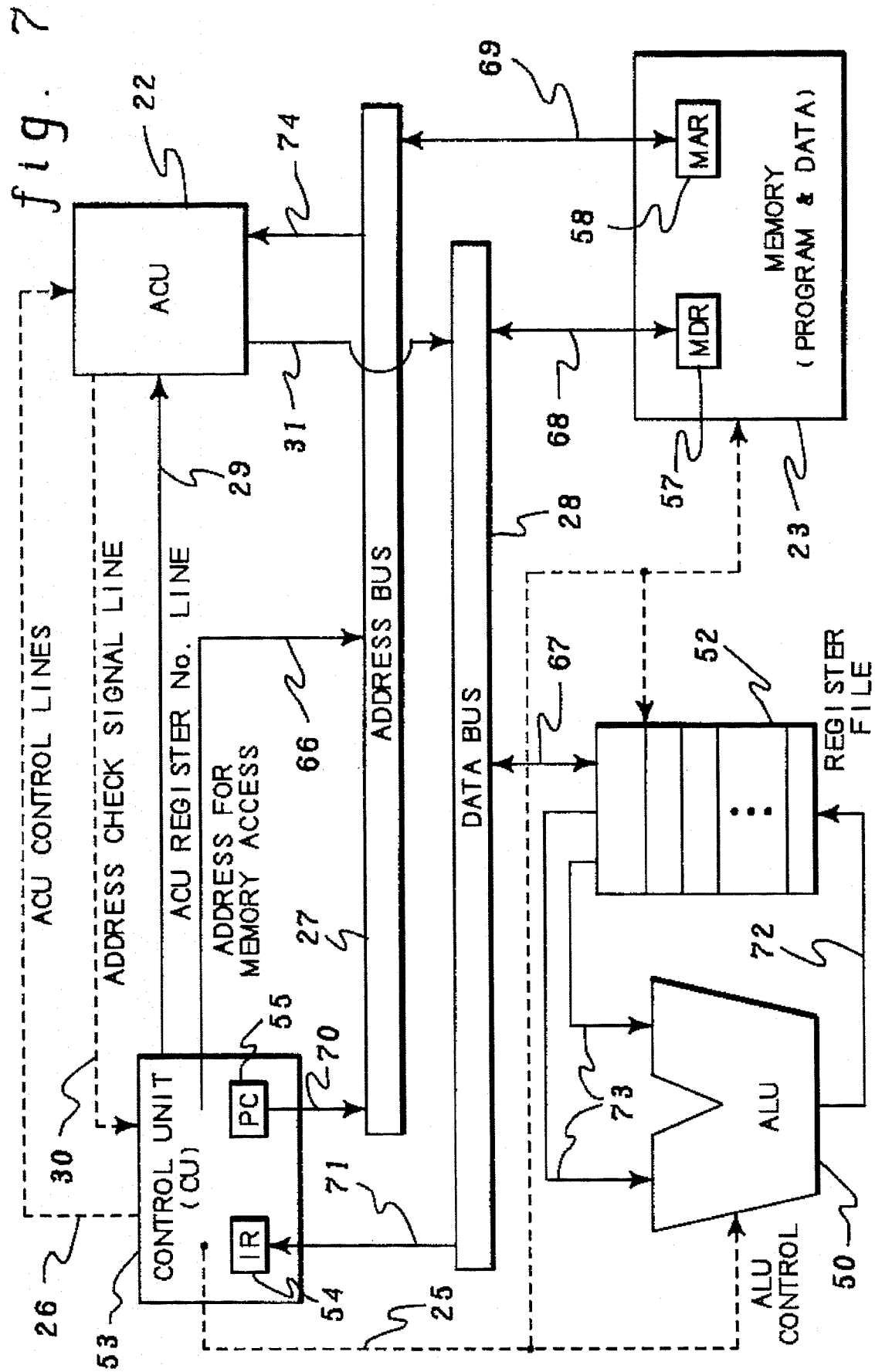

THE ACU-CPU INTERFACE

ACU COMMANDS FROM CPU ON ACU CONTROL LINES

OVERALL STRUCTURE OF THE ACU

PROGRAM BEFORE COMPILATION
AS ORIGINALLY WRITTEN

INSTRUCTION

| | | |
|---|---|---|
| 1 | AR | R13, R15 |
| 2 | L | R13, 0 (R13) |
| 3 | ST | R1, 112 (R13) |
| 4 | L | R2, 18 (R12) |
| 5 | ST | R3, 116 (R13) |
| 6 | L | R4, 10 (R12) |
| 7 | SR | R2, R4 |
| 8 | AR | R2, R6 |

*fig. 12a*

COMPILED PROGRAM FOR VLIW WITHOUT
USING OPTIMIZATION PROCESS

INSTRUCTION

| | | |
|---|---|---|
| 1 | AR | R13, R15 |
| 2 | L | R13, 0 (R13) |
| 3 | ST | R1, 112 (R13) |
| 4 | L | R2, 18 (R12) ST R3, 116 (R13) |
| 5 | L | R4, 10 (R12) |
| 6 | SR | R2, R4 |
| 7 | AR | R2, R6 |

*fig. 12b*

COMPILED PROGRAM FOR VLIW USING OPTIMIZATION PROCESS

| INSTRUCTION | | |
|---|---|---|
| 1 | AR R13, R15 | L_SAVE R2, 18 (R12), 1 |
| | | L_SAVE R4, 10 (R12), 2 |
| 2 | L R13, 0 (R13) | SR R2, R4 |
| 3 | ST_CHECK R1, 112 (R13) | CLEAR-ACU 1 |
| | | ST_CHECK R3, 116 (R13) |
| | | CLEAR-ACU 2 |
| | | AR R2, R6 |
| 4 | ... | | fig. 12C

RECOVERY CODE: FOR COMPILED PROGRAM USING OPTIMIZATION PROCESS

/*RECOVERY CODE FOR INSTRUCTION 3*/

| INSTRUCTION LINE | | |
|---|---|---|
| 1 | ST R1, 112 (R13) | ST R3, 116 (R13) |
| | CLEAR-ACU 1 | CLEAR-ACU 2 |
| 2 | L R2, 18 (R12) | L R4, 10 (R12) |
| 3 | SR R2, R4 | |
| 4 | AR R2, R6 | |
| 5 | GO TO INSTRUCTION 4 (FIG. 12C) | | fig. 12D

METHOD AND APPARATUS FOR IMPROVING PERFORMANCE OF OUT OF SEQUENCE LOAD OPERATIONS IN A COMPUTER SYSTEM

This application is a continuation of application Ser. No. 07/880,102, filed May 6, 1992.

BACKGROUND OF THE INVENTION

1. Field of the Invention

This invention relates in general to computer systems and, in particular, to a method and apparatus for improving the efficiency and speed of operation of digital computer systems. More specifically, the invention relates to methods and apparatus to reorder the sequence of instructions in a computer program for faster operation.

2. Background Art

Speed is an important criteria by which a computer is judged. The general long term trend in the industry is development of increasingly more efficient higher speed computers.

One way of increasing the speed of execution of computers is to reduce memory latencies. A memory latency is the time delay between the moment a request is made for an operand from memory at the beginning of an instruction cycle to the time it is delivered to the appropriate register in the processor. Given the speed and efficiency with which processors and CPU's can process information at present, memory latencies can cause relatively long time delays between the time a processor becomes idle after initiating a memory request and can actually start a work cycle when the requested data is returned from memory. In fact a processor can easily spend more of its time waiting for operands or information to work on than is consumed in data processing.

The ideal situation would be to bring the operand into the appropriate register in the processor as soon as both the operand and the register are available. In many instances this can be done well before the processor has a need for the operand. The operand would then be readily available to the processor when needed, eliminating lost time waiting for the operand to be delivered from memory. However, a number of impediments exist which prevent such early loading of an operand into the appropriate register in the processor.

One such impediment is that a computer must perform its operations in a fairly rigid sequential pattern to maintain the integrity of its output. Performance of its operations in sequence by a computer entails loading the necessary instructions into the processor and loading into the appropriate registers the particular operands necessary for that instruction. The processor then performs the called for operation on the operand or operands. The computer then stores the results. Once the storing of the results is completed, the processor commences the next instruction cycle by fetching the instruction needed, then the operand or operands needed etc., and continues with roughly the same process. Generally, before execution of the next instruction can be commenced, the prior instruction cycle must be completed and its results stored.

Recent developments have resolved some of the aforementioned impediments. One such recent development involves processors designed with an instruction pipeline or queue feature, which allows the processor to fetch several instructions at a time and have them available before they are needed by the processor for execution. Upon completion of each instruction cycle, the computer has available in the processor the next instruction to be executed so there is no delay caused by waiting for the next instruction from memory. This is a feature common to uniprocessors, as well as more sophisticated processors. Also, almost all high performance computers can overlap the execution of several instructions. High performance computers, to make optimal use of their hardware resources, execute their instructions (or the primitive operations comprising them) often in an order different than the one specified in the original program.

There are a number of ways to overlap instructions or operations in the operation of a computer. One alternative is to implement it through hardware alone, but this is a complicated and not too promising method. Another method is to have the compiler reorder the execution of the program through an optimization process; this is by far the more efficient and effective method.

The compiler, during compilation of a program, will reorder the sequence of instructions and form sets of instructions whose execution can be overlapped. The execution of two instructions can overlap and violate the order specified in the program only if the compiler can guarantee, through program analysis, that the storage locations, memory or register locations, used to store the results produced by any one of these instructions are different from those used by other instructions to fetch its input operands and to store its results. In the literature on this subject, these are known as anti/output/true data-dependence constraints.

Enforcing the above mentioned constraints is easy when operands are fetched from registers and results are stored into registers. However, when the operand is fetched from memory or the results are stored into memory, the task is much more difficult. The problem is particularly acute when the addresses of memory locations referenced by the instructions are to be computed when the program is executed by the computer. In this situation, determining whether two address calculations will yield the same address at the time the program is executed is theoretically impossible or requires complex program analysis capabilities not expected from compilers in the foreseeable future. Also, compile time enforcement of data dependencies becomes exceedingly conservative when indirect addressing or pointers are used to access data.

Experience with program analysis techniques indicates that in most situations, where a compiler cannot determine whether two addresses to be computed and used in the program will be identical or different at the time of program execution, there is an extremely high probability the addresses will turn out to be different. However, the compiler is forced to assume, for the sake of the program integrity and correctness, that they will be the same, resulting in a significant loss in available parallelism, operating efficiency and speed. It would be an unsafe compiler optimization for the compiler to do otherwise and assume there will be no address conflict.

The problem then, simply stated, is how to allow a compiler to fully optimize the potential for out of sequence operand fetching? An out of sequence operand fetch generally being a load operation of an operand ahead of one or more store operations in the compiled form of the program, the load of the operand having been at a point after the store operation in the unoptimized form of the program.

One attempt to have the compiler optimize the execution of a program by allowing load operations to be executed out of sequence ahead of store operations is described in "Run-Time Disambiguation: Coping with Statically Unpredictable Dependencies", by Alexandru Nicolau; IEEE Transactions On Computers, Vol. 38, No. 5, May 1989. Nicolau's article describes a process in which a compiler identifies when a load can possibly be moved ahead of a store operation, then inserts necessary coding so the processor can check at the time the program is executed by the computer to determine if there is a match between the address of the store and the load operation. If there is no match, the processor then executes a branch operation to an optimized sequence of instructions where the load has been moved ahead of the store. If there is a match, the processor takes a branch to a safe code which does not allow the load operation to be moved ahead of the store operation. Having the processor do the checking to determine if there is a match between the address from which the load originated and the address assigned to the store during program execution is a hindrance to increasing speed of execution. It in fact sometimes appears to take longer for a program to be executed in Nicolau's arrangement than when the program is run in the program's original unoptimized sequence. Nicolau notes this fact in his article. One of the difficulties with the process of Run Time Disambiguation is that the processor or CPU must do all of the work, including the comparison of the addresses, a process for which the CPU is not suited. Each Arithmetic and Logic Unit (ALU) in the CPU can only compare one address of a load operation with one address of a Store operation at a time. The CPU must generate the address of the store operation and compare it to the address of the load operation before the load operation is moved out of sequence and executed.

SUMMARY OF THE INVENTION

The purpose of the invention herein is to resolve the problems noted above with the existing art and to increase the overall data processing speed of a computer and make its operation more efficient.

The invention described herein increases the speed and efficiency of a computer system by eliminating a substantial portion of the memory latencies that may otherwise exist during the execution of a computer program.

It is a further object of this invention to assure error free operation of the computer, while obtaining these increases in speed and efficiency in the operation of the computer.

The invention involves several new major components which, when combined in a computer system, achieve the desired result of increased speed and efficiency without loss of accuracy. The new elements are an improved compiler which includes an optimizer, an improved CPU or processor having new instructions in its instruction set, and new hardware for rapidly comparing CPU address with previously generated addresses, referred to herein as an Address Compare Unit (ACU) which responds to the new CPU instructions. The ACU will usually be implemented using associative memory (also known as content addressable memory), but other implementations are possible.

In brief, a method is provided for error free performance of out of sequence load operations that uses the improved compiler, associative memory or ACU, and the improved processor or CPU in conjunction with the new instructions. In a basic aspect of the inventive process, during program compilation, the improved compiler, which includes an optimizer, identifies a load operation that can be moved out of sequence ahead of an associated store operation and then moves the load operation out of sequence ahead of the associated store operation. The associated store operation is identified with the load operation which has been moved ahead of it in the compiled form of the program. During processor execution of the compiled program, the address of an operand fetched by the out-of-sequence load operation is saved to the ACU. The ACU compares the address saved during the load operation with the address generated by the associated store operation by the processor when the store operation is executed. If the compared addresses are different, the processor continues to execute the program and then clears the saved address of the load operation in the ACU as it is no longer needed. If the compared addresses are identical, the store operation is aborted and a recovery program is run. The purpose of the recovery program is to eliminate the errors caused by reversing the order of the load and store instructions when both access the same memory location.

It is a further aspect of this invention that the compiler, after identifying a load operation that can be moved ahead of an associated store operation to improve the execution efficiency of the program, flags that load operation if it cannot prove that such optimization is safe. In the preferred embodiment it accomplishes the flagging by changing the load instruction to a Load-Save instruction. Additionally, the compiler changes and flags the associated store operation. In the preferred embodiment it accomplishes the flagging by changing the store instruction to a Store-Check instruction. The compiler then moves the Load-Save instruction ahead of the Store-Check instruction. The compiler then adds an additional instruction after the Store-Check instruction, an instruction whose purpose is to clear the address of the operand saved by the load operation after it has been compared to an address used by the store operation during execution of the compiled program. The compiler also generates a recovery sequence to be used during execution of the compiled program if an address of an operand saved during the load operation is identical to an address generated by the store operation during the execution of the compiled program. It is a further aspect of this invention that the processor has means for executing the compiled program and also for recognizing the flagged load operation which, in the preferred embodiment, is flagged a Load-Save operation, and saving to the ACU, the memory address of the operand fetched by that load operation. The processor also has means for recognizing the flagged store operation which, in the preferred embodiment, has been designated a Store-Check operation. Upon processor's identification of the flagged store operation, an address is generated and sent to the associative memory to be compared with the addresses saved by the load operations therein.

It is a further aspect of this invention that the "Address Compare Unit" (ACU), receives an address from the processor which has been sent to it during a Load-Save operation and saves it in a specific memory location therein. Subsequently, upon receiving a Store-Check instruction and an address which the processor has generated for the store operation, the ACU compares that generated address with the address saved by the load operation. If there is no match between the address generated by the store operation and the address saved during the load operation, then the computer continues to execute the program. However, if there is a match between the addresses when compared, the associated memory, or ACU, sends a signal back to the processor to notify it of the same.

The address compare unit also clears the saved addresses it is storing upon receiving the appropriate clear signal which, in the preferred embodiment, is generated by the instruction "Clear-ACU".

If the processor receives a signal from the ACU that there is a match between the address that is sent for checking and the address saved in the ACU, the processor then runs the recovery code.

In another aspect of this invention the address compare unit is made up of a plurality of memory registers into which the addresses are saved. Associated with each one of these memory registers is a valid bit location or another equivalent mechanism, which tells the system whether or not the address saved in the memory register is valid and should be checked or there is no relevant address therein and the memory register is available to receive additional information. Additionally, with each memory register and its paired valid bit, there is a control port which receives the signals from the rest of the system and, according to these signals, either conducts the necessary saving operation, comparing operation or clearing operation. The control ports are in turn activated and controlled by a decoder.

In another aspect of this invention, the ACU, upon receiving the appropriate signal, can save the addresses contained in it to another memory location and in turn make itself available to receive additional addresses being generated by perhaps another application which the system is commencing. In turn, the system can restore the addresses that have been previously saved at a location outside the ACU back to the ACU to continue with the original application where it left off.

BRIEF DESCRIPTION OF DRAWINGS

These and other objects, features, aspects and advantages of the present invention will be readily understood from the following detailed description when read in conjunction with the accompanying drawings in which:

FIG. 3A is a flow chart of the action of a traditional optimizer on a branch operation;

FIG. 3B is a flow chart of the action of an optimizer of the present invention on a branch operation;

FIG. 4 depicts the form of three of the four new instructions of the instruction set as they may appear in a computer program compiled with the improved compiler of this invention;

FIGS. 5A–5B is a flow chart illustrating how the optimizer working within the improved compiler compiles the program in accordance with the precepts of the present invention;

FIG. 6A is an example of a sequence of a computer program in an uncompiled and unoptimized form;

FIG. 6B depicts the sequence of the computer program from FIG. 6A compiled without the use of the invention herein;

FIG. 6C depicts the sequence of the computer program from FIG. 6A compiled with the use of the improved compiler described herein;

FIG. 6D depicts a sample of the recovery code that would be generated by the improved compiler of the present invention for the compiled program set forth at FIG. 6C;

FIG. 7 is a schematic diagram of the overall computer system of the present invention in more detail than FIG. 1;

FIG. 12A illustrates sequence of a computer program in an uncompiled and unoptimized form;

FIG. 12B depicts the sequence of the computer program from FIG. 12A after compilation for execution on a VLIW computer without the use of the invention herein;

FIG. 12C depicts the sequence of the computer program from FIG. 12A after compilation with the use of the invention herein for execution on a VLIW computer; and FIG. 12D depicts a recovery code prepared by a compiler using the invention herein for the compiled form of the program set out at FIG. 12C.

DETAILED DESCRIPTION OF THE PREFERRED EMBODIMENT OF THE INVENTION

Overview of the Entire System

As previously noted, the purpose of this invention is to increase the speed of execution of a computer while maintaining efficiency and assuring error free operation of the computer. It is already well known by those skilled in the art that if memory latencies could be reduced significantly, the efficiency and speed of computers could be significantly increased. It is also known in the art that allowing out of sequence operand fetches where a load operation is moved ahead of one or more store operations is one way to achieve added speed and efficiency. This invention's purpose is to provide the means to accomplish those objectives and assure that it is error free.

Figure 1:
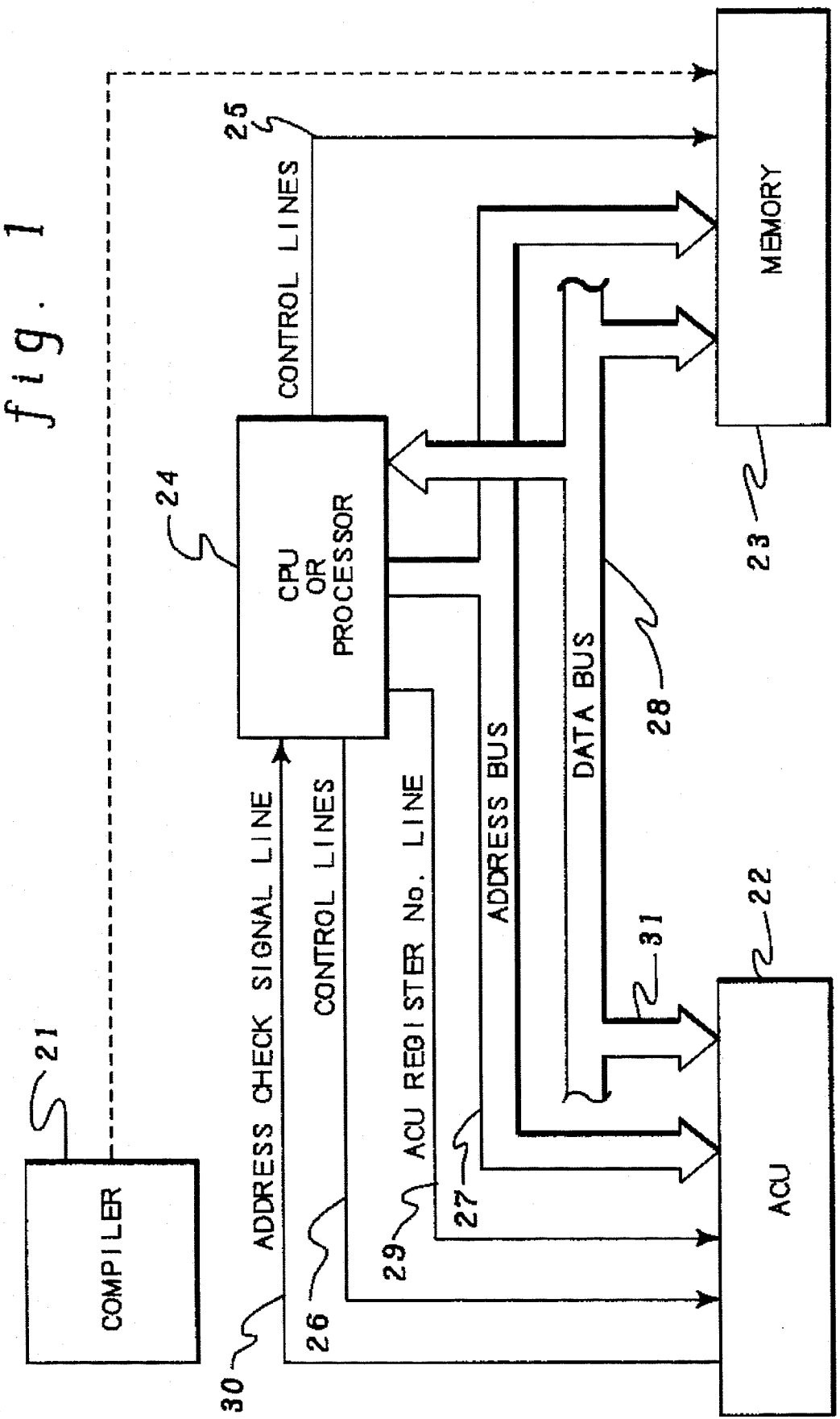
FIG. 1 is a block diagram presenting an overview of the computer system of the present invention.

The principal components of the apparatus of the present invention are depicted in FIG. 1 and include an improved compiler 21, an improved processor 24 having four new instructions added to its Instruction Set, an Address Compare Unit (ACU) 22 and a memory 23. The system also contains appropriate interconnections, namely control lines 25 and 26, address bus 27, and data bus 28, as well as an Address Check Signal Line 30 and an ACU Register Number Line 29. The arrows in FIG. 1 depict the direction of signal flow. The four new instructions added to the instruction set of the processor are denoted: Load-Save, Store-Check, Clear-ACU and Read-ACU.

The general operation of the computer system of FIG. 1 will now be briefly described:

The improved compiler 21 is basically a standard compiler with the ability to use the new instructions of Load-Save, Store-Check and Clear-ACU. As is well known in the art, a compiler translates a high level language such as Pascal, Fortran, etc. into machine code readable by the computer; however, the improved compiler of this invention will also be making decisions about when and where it can optimize the execution of the program and improve the speed and efficiency of its execution, by using the hardware, of this invention.

During the compilation process, the improved compiler will optimize the sequence of execution of the program by deciding when and where it can move a load operation ahead of one or more store operations even though this would often result in an unsafe compiler optimization. At the time the compiler makes the decision to move the load operation ahead of the store operation, it changes the load command associated with the load operation to a Load-Save command. The compiler moves the Load-Save command ahead of the store command, even when it cannot determine that the address of the operand to be fetched by the load operation and the address to be generated by the store operation will be different at the time of program execution. When the compiler, during the compilation process, encounters a store operation before which one or more load operations have been moved in the above mentioned manner, it will change that store operation to a Store-Check, at the same time the compiler will add a Clear-ACU instruction immediately after the Store-Check command and a recovery sequence reached by a conditional branch operation in the interrupt handler to be run upon processor receipt of an appropriate signal. The compiler will continue this process until compilation of the program is completed. Interrupt handlers and their software and hardware aspects are well known in the art.

Accordingly, the compiler 21 compiles the program in the usual manner with the additional acts noted above and prepares the program for execution by the CPU or processor. Then the compiled program with the additions envisioned by this invention are placed in the memory of the computer to be run.

Whenever a Load-Save command is encountered during the execution of the compiled program, the CPU 24 executes a normal load command which usually involves a fetch of an operand from a specific location in memory 23 and transfer of that operand to a register in the CPU 24. The CPU 24, as part of that Load-Save command, then saves the memory address of that operand to a register in the ACU 22. This particular Load-Save command has pre-assigned to it during program compilation, a specific register in the ACU 22 to which the memory address of the operand is to be saved and that register number is communicated to the ACU 22 over register number line 29. As is well known in the art, when the program is compiled and optimized, the memory address from which the operand will be fetched by the load operation is normally not known; that address is generated or calculated by the load operation at the time the load command is executed during the running of the program.

Whenever the CPU encounters a Store-Check instruction, it starts the normal store operation by generating a memory address for the store operation; however, before it actually executes the store operation, the CPU 24 sends the generated address to the ACU 22 to be compared by the ACU 22 with addresses saved in the ACU 22 by previous Load-Save commands. If the address generated by the store operation is not identical to any previously saved address, execution of the compiled program continues. After checking of the address is completed, the Clear-ACU instruction clears from the ACU 22 all address of load-save operations which do not have to be compared to any more addresses generated by Store-Check operations. On the other hand, if the address generated by the Store-Check operation is identical to any address saved in the ACU 22, a signal is then initiated by the ACU 22 and sent over the address check signal line 30 to the CPU 24. Upon receiving this signal, the CPU initiates the execution of the recovery program previously prepared and put in the compiled and optimized program for this situation by the compiler. The purpose of the recovery sequence, which will be discussed in detail below, is to recompute the calculations which were in error. The error being the generating of an address by the Store-Check command, which is identical to the address of an operand previously fetched by a Load-Save command. The Load-Save command having followed the Store-Check command in the unoptimized form of the program. The value to be stored in the memory by the Store-Check command, which would be fetched by the Load-Save command, if both were in the original order of the unoptimized program, is used to re-calculate all calculations which were programmed with the erroneous values. Also, with this sequence of events, the Clear-ACU instruction would clear the saved addresses in the ACU 22 which are no longer needed.

The Compiler and Compilation Process

A compiler is a complex computer program which translates a computer program written in a source language, e.g. Fortran, Basic, Pascal, etc., into machine language. According to the principle of this invention the compiler does more than this; the compiler also optimizes the execution of the program using the ACU hardware. The compiler does this with an optimizer which makes up part of the compiler. An optimizer is a routine or process in a compiler used to modify a computer program during compilation to make it run more efficiently. The efficiency generally being sought is greater speed of execution. Among the approaches available to achieve this and the method used in this invention is a reordering of the sequence of execution of a portion of the program. A compiler, like any other program, is necessarily executed by a programmed processor.

The optimizer of this invention accomplishes its objective by moving loads ahead of stores so the operands needed by the processor will be available at the appropriate time, thus eliminating most memory latencies. The optimizer, during the compilation process, will be confronted with three possibilities: a) There is no problem, it can be certain the address assigned to the store operation when the program is run will be different from the address of the out of sequence load; b) There is a very high probability that the address assigned to the store operation will be the same as that of the out of sequence load; and c) the equality of the two addresses cannot be determined at compile time and, therefore, there is a slight chance that the address assigned to the store operation will be the same as that of the out of sequence load.

Figure 2A:
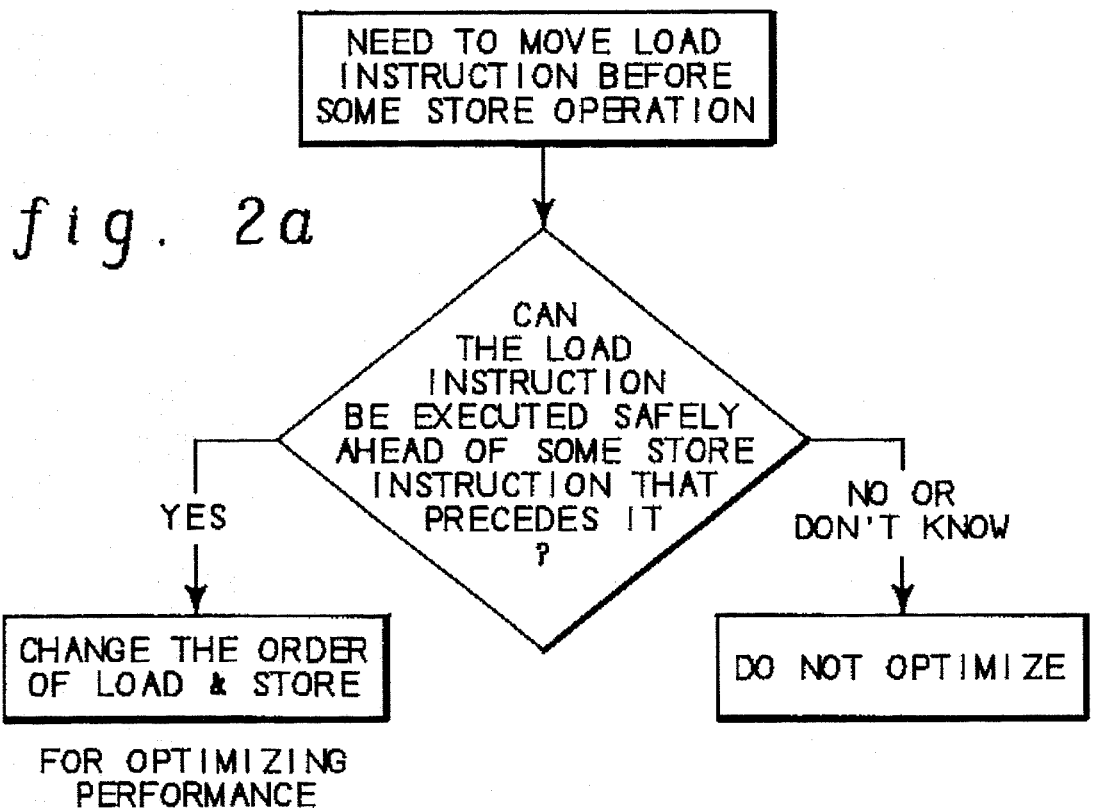
FIG. 2A is a flow chart of the action of a traditional optimizer.
Figure 2B:
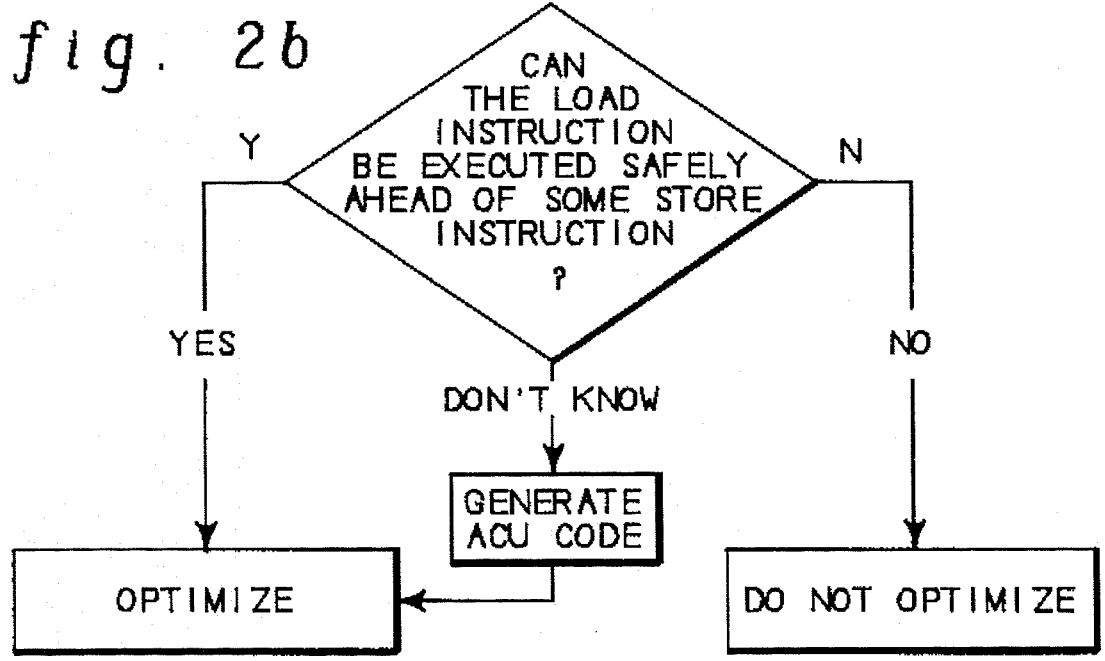
FIG. 2B is a flow chart of an optimizer in accordance with the principles of the present invention.

Given the three possibilities listed above, traditional optimizers are very limited in what they can do. FIG. 2A shows diagrammatically what their options are. As can be seen from FIG. 2A, unless the optimizer can be certain there will be no match between the address assigned to the store operation at the time of program execution and the address of the load operation, it cannot move the load ahead of the store. Contrast this with what an optimizer can do with the system described herein as depicted in FIG. 2B. The improved optimizer can make what amounts to an unsafe compiler optimization. It can move the load ahead of a store under both situations "a" and "c" listed in the preceding paragraph. With respect to situation "c", the unsafe compiler optimization situation, the improved compiler generates a code to assist in checking for this anomaly or possible error. The code will be described below. Those familiar with the art know that the vast majority of potential loads that can be moved ahead of store operations during compilation are those that have a slight probability of resulting in the address assigned to a store operation at the time of program execution being identical to the address of an operand fetched by an out of sequence load operation. Thus, an effective and efficient method for detecting the rare instances where the address assigned to the store operation and that of the load operation are identical would add considerable speed to program execution. A method of checking for the anomaly, coupled with a method of correcting the anomaly which does not cause a loss of performance, would make it possible to use the procedure of unsafe compiler optimization in a safe and effective manner. As it will be demonstrated in detail shortly, the invention described herein provides an effective and efficient manner to detect the rare anomaly noted above when used in combination with the appropriate recovery sequence to be described below.

Traditional optimizers, as depicted in FIG. 3A, rarely perform optimizations by moving code past branch operation boundaries. On the contrary, as can be seen from FIG. 3B, an optimizer used in the system described herein can very easily move load operations ahead of branch operations. In effect, what the optimizer used in the system herein does is determine if the execution of a Load-Save operation might bypass its Clear ACU instruction as a result of a branch operation, and then inserts a Clear-ACU command on all targets of the branch operation which do not lead to the Clear ACU command, if such a Clear-ACU command has not been inserted there already. Additionally, the compiler inserts in the Clear-ACU instructions, the ACU register number in which the address of the load operation is saved in the ACU. It can thus move the Load-Save operation ahead of the branch operation. The target being the place in the program a branch operation proceeds to for continued execution of the program at the end of the branch's execution.

Compilers, their operation and programming are well known to those skilled in the art. Consequently, there is no need for a detailed discussion herein. A good, general reference on compilers, including compiler optimizations, their use, programming and principles is "*Compilers: Principles, Techniques and Tools*", by A. V. Aho and R. Sethi, Addison-Wesley, 1986. In discussing the compilation process, only those aspects which are unique and relevant to this invention will be presented.

In addition to the normal functions which the compiler will be conducting in the compilation process, there are two additional processes. One is optimization and the other is making the necessary code changes and adding the necessary recovery sequences.

In the optimization process, the improved compiler acts as an optimizer and makes a determination as to when a load can be moved ahead of a store. This aspect was discussed above. As noted, the compiler, acting as an optimizer, will be making normally unsafe compiler optimizations. Naturally, as previously noted herein, if there is a very high probability of an anomaly, the decision will be made to not move the load ahead of the one or more stores. However, if the probability is low that an anomaly will occur, which is the situation in the majority of cases, then the load would be moved ahead of one or more stores.

Figure 5B:
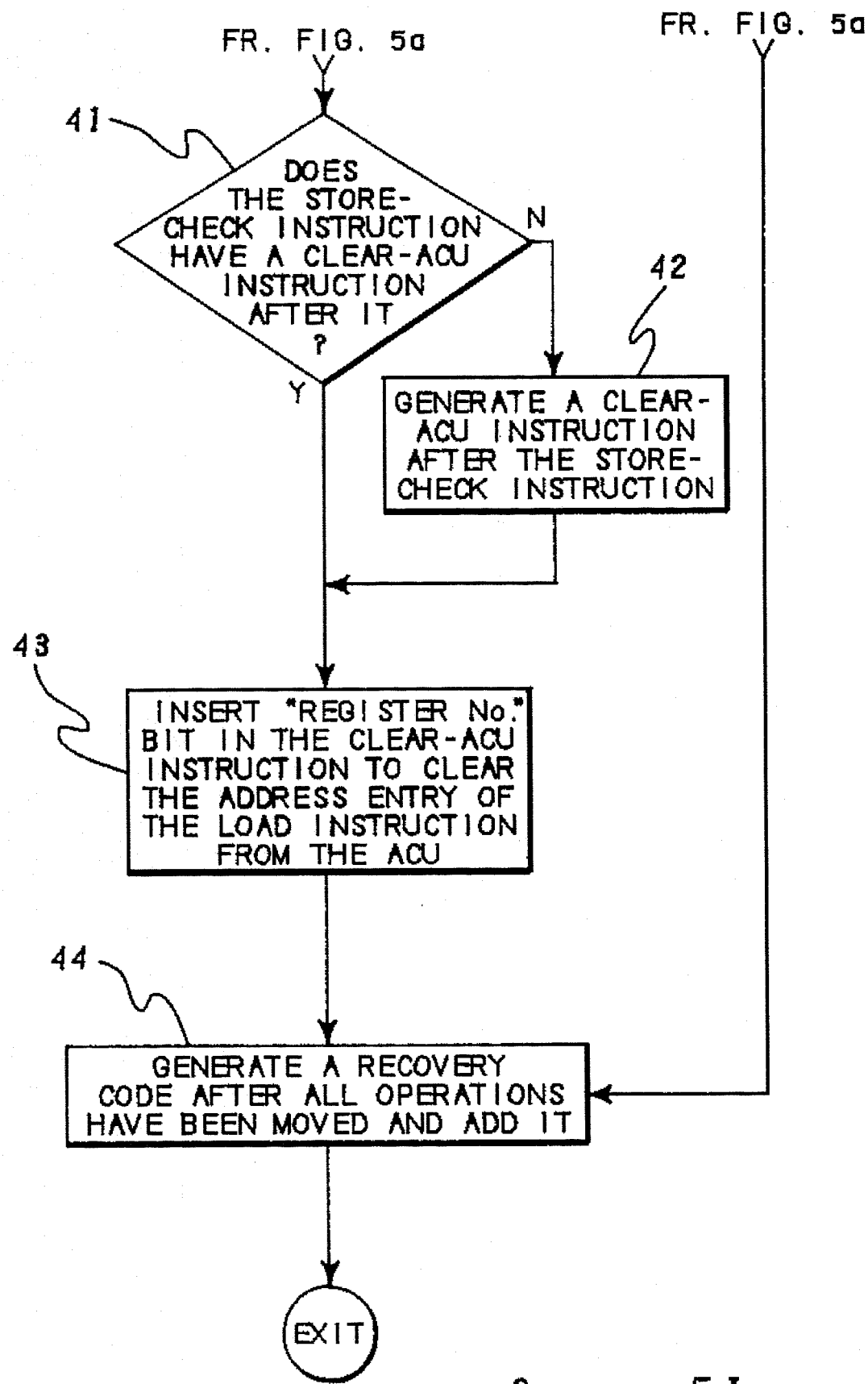

Once the compiler has made the decision to optimize and has also determined that there is at least a slight chance of an anomaly arising at the time of program execution, it will then generate the necessary codes and program alterations to assure a proper checking process at the time of program execution. FIGS. 5A–5B is a flow chart depicting the sequence of events after the compiler has made the basic decision to optimize and has moved a load ahead of one or more stores Step 36. Next the compiler changes the load which has been moved out of sequence to a Load-Save instruction Step 37. In the next Step 38, the compiler determines whether or not the store instruction or all store instructions before which the load has been moved have already been converted to Store-Check instructions. If any of the store instructions has not previously been changed to a Store-Check instruction, the next step as shown at 39 will be to change all of those store instructions to Store-Check instructions. In the next step 40, the compiler will take one of two actions. If it determines that this is not the first time that the particular load instruction has been switched with a store instruction, then it will proceed to the end of the routine and prepare a recovery code, as noted at 44, and then exit the routine and presumably return to the normal compilation process. However, if at Step 40 it is determined that this is the first time that the load instruction has been switched with a store instruction, it will proceed to the next Step 41, at which point the computer will make a determination as to whether or not the Store-Check instruction has an attached Clear-ACU instruction. If it doesn't, it will proceed to Step 42 and generate a Clear-ACU instruction and then proceed to Step 43 of FIGS. 5A–5B. If at Step 41 the compiler determines that the Store-Check instruction has a Clear-ACU instruction following it, the compiler will proceed directly to Step 43. At Step 43 the compiler will insert the register number bit in the Clear-ACU instruction to clear the entry of the address saved during the load operation from the ACU register. The compiler will then proceed to the next Step 44 and generate the necessary recovery code and add it to the compiled program. Once this is completed the compiler will exit the routine and proceed with a normal compilation process.

The recovery code inserted in the compiled program by the improved compiler is reached by a conditional branch operation in the interrupt handling routine, which would be run if an anomaly arises. The anomaly, as previously noted, occurs when the address assigned to a store operation is determined by comparison in the ACU to be identical to one of the addresses saved during one of the Load-Save operations. The address of the store operation, as previously noted, is generated by the processor at the time the Store-Check operation is commenced. The generation and preparation of recovery codes are known in the art.

As noted previously, the invention herein would have no difficulty in dealing with branch operations, specifically conditional branch operations that may be encountered during program compilation. Generally, the most common type of branch operation that would be encountered would be a conditional one. The potential problem posed by a conditional branch operation occurs when a load is moved ahead of the branch operation and the associated Store-Check and Clear-ACU operations are on one of the several targets of the branch operation.

If the branch operation were to be activated and run and were to not select the target containing the Store-Check and, in particular, the Clear-ACU instruction, which was meant to clear the previous load instruction address from the ACU, there may be a failure to properly remove the address saved by the Load-Save operation at the appropriate time from the ACU. However, the compiler, at the time of program compilation, will be able to determine whether there is a possibility that the running of the branch operation could bypass the necessary Clear-ACU instruction. If it determines that this is a possibility, the compiler would then add an additional Clear-ACU operation at those targets of the Branch operation which originally avoided the Load-Save operation. Thus, irrespective of which branch target was taken, the information saved by the Load-Save command in the ACU will be removed in a timely manner.

As noted, the compiler and its optimizer only use three of the four new commands added to the instruction set. FIG. 4 depicts the three commands used by the compiler in the system described herein. Under each heading in FIG. 4 is a sample of how a program line might appear after compilation. For example, under the heading "Load-Save Command", the first item that would appear would be the actual instruction "Load-Save"; the next item that would appear would be the CPU register the operand would be loaded into which is depicted as Dest_Reg. The next portion of information is the address in memory from which the operand is to be loaded; this information would most likely be computed at the time the program is executed in the computer. This would also be the address saved to the ACU. Finally, there is the ACU buffer number, ACU-Buffer-No$_n$. The buffer number would identify a specific register in the ACU into which the address of the load operation is to be saved at the time of program execution. As will be described in detail below, the ACU is an associative memory device made up of individually controlled registers capable of storing one address in each register.

Under the heading "Store-Check Command" in FIG. 4, is an example of how a line of this particular instruction might appear in a computer program after compilation. After the instruction Store_Check is the statement Data_Reg identifying the CPU register which would contain the operand to be saved to memory. The next item, Address, would be the memory address generated by the computer at the time the store instruction is executed. It is this generated address which would be checked against the addresses saved in the ACU.

A Clear-ACU command normally would follow most of the Store-Check commands in the program. The appearance of this instruction in a compiled program is illustrated under the heading "Clear-ACU Command" in FIG. 4. The first item is the instruction itself, Clear_ACU; following it are the numbers of all of the buffers to be cleared which in this example are designated ACU Buffer_No$_1$ ... ACU Buffer_No$_n$. At the time of compilation, the compiler is able to identify the registers to be cleared since it assigns the ACU registers into which the addresses of the load operations will be saved. Also, the compiler, during the compilation process, knows ahead of which particular store operations it has moved a load operation. The position of each store operation, aside from the Load-Save operations moved ahead of them, remains unchanged by the compilation process. Consequently, the compiler knows which particular Store-Check operation is the last one ahead of which a particular Load-Save operation has been moved. When the compiler reaches this last Store-Check operation, it will add to the Clear-ACU instruction following it the number of the register into which the address of that Load-Save operation was saved. This is due to the fact that its retention is no longer necessary.

For illustrative purposes, FIGS. 6A, 6B, 6C and 6D depict respectively the following: a sequence of a computer program before compilation, the sequence compiled without the use of the invention described herein, the sequence compiled with the use of the invention described herein, and the recovery code that would be generated by the compiler.

In FIG. 6A, instruction "i1" adds the contents of registers 13 and 15 and places the result back in register 13 (the registers being referred to in this program sequence being those of the CPU unless otherwise stated). Instruction "i2" forms a memory address by adding offset zero to the contents of register 13, using this memory address to fetch a value from memory, and places the fetched value back into register 13. Instruction "i3" forms a memory address by adding offset 112 to the new contents of register 13 and uses this memory address to store the contents of register 1 into memory. Instruction "i4" forms a memory address by adding offset 18 to the contents of register 12, using this address to fetch a value from memory, and stores this fetched value into register 2. Instruction "i5" forms the memory address by adding offset 116 to the contents of register 13 and uses this address to store the contents of register 3 into memory. Instruction "i6" forms the memory address by adding offset 10 to the contents of register 12, using this address to fetch a value from memory, and stores this fetched value into register 4. Instruction "i7" subtracts the contents of register 4 from register 2 and stores the result back in register 2. Instruction "i8" adds the contents of registers 2 and 6 and stores the result back in register 2.

As noted, FIG. 6B is the same program sequence as set out in FIG. 6A as that program sequence would appear after compilation without the use of the improved compiler of this invention.

FIG. 6C is an illustration of how the program could appear after compilation of the program sequence set forth in FIG. 6A using the optimization process and compilation methods of the present invention. During the compilation process, the optimizer determines that lines i4 and i6 in FIG. 6A, both of which are load operations, should be moved out of sequence ahead of store operations i3 and i5, to reduce the execution time of this code segment. Line i4, FIG. 6A, is changed to a Load-Save operation and moved ahead of one store operation, becoming instruction line 2 of FIG. 6C. The load operation of line i6, FIG. 6A, is changed to a Load-Save operation and moved ahead of two store operations to become line 3, FIG. 6C of the compiled program. Both Load-Save operations, lines 2 and 3 of FIG. 6C, have been assigned register numbers in the ACU. On line 2, FIG. 6C, the assigned ACU register number is "1" at the end of the line and on line 3 it is "2", which appears at the end of that line. Thus, the loads have been moved out of sequence ahead of various store operations so the operands they will load will be moved into registers in the CPU, substantially ahead of the time they will be needed by the CPU. The operands then will be readily available for the CPU to use as soon as needed, eliminating any delay in the functioning of the processor and thus eliminating attendant memory latencies.

Line i3 of FIG. 6A, upon compilation of the program, becomes line 6, FIG. 6C, and the instruction is changed to a Store-Check operation. The compiler has also added at line 7, FIG. 6C, a Clear-ACU 1 to clear the address saved in register 1 of the ACU. This would be the address of the operand loaded during the Load-Save instruction, line 2, FIG. 6C. The address in register 1 of the ACU was only moved ahead of this one store and does not have to be compared to any other. Line i5 of FIG. 6A becomes, during compilation, line 8 of FIG. 6C and the instruction is changed to a Store-Check. Immediately following on line 9 of FIG. 6C, a Clear-ACU 2 instruction is added to clear the address in register 2 of the ACU. The retention of the address in register 2 of the ACU is no longer required; that address now having been compared to addresses generated during both of the store operations in front of which it had been moved.

The recovery code is shown in FIG. 6D for the two Store-Check instructions shown in FIG. 6C. For the first Store-Check instruction, "Store-Check R1, 112 (R13)", the first instruction re-executes the aborted Store-Check operation and completes it. The next two instructions re-execute the two unsafe loads which are Instructions 2 and 3 in FIG. 6C. The "SR R2, R4" instruction is also re-executed because it uses values created by the speculative load instructions and executes before the corresponding Store-Check instruction. Then the control returns from the recovery code to the main program because of the "Go To L1" statement. This returns it to the main program at line 7, FIG. 6C.

For the second Store-Check instruction, "Store-Check R13, 116 (R13)", execution of the recovery code involves: (a) Re-executing the unfinished store instruction, re-executing "L R4, 10 (R12)" load instruction, which is the only load instruction executed speculatively with respect to this store instruction, and (b) Executing the "SR R2, R4" instruction which depends on the load instruction. After that the recovery code branches to the main program pursuant to the instruction "Go To L2".

A recovery code sequence is associated with each Store-Check instruction. When a Store-Check exception occurs, the address of the Store-Check instruction that caused the exception is available to the processor, and is used to select the appropriate recovery code sequence, using a table which lists the starting address of the recovery code sequence for each Store-Check instruction.

If a large number of load operations have moved past a particular store operation, any one of them can use the same memory address as the store operation to cause a Store-Check exception. The recovery code can, in this situation, interrogate the contents of the ACU, using the "Read-ACU" command to identify which load operation caused the exception, and re-execute only that load instruction and the subsequent instructions that are affected by it. However, in the examples in FIGS. 6A–6D, the first Store-Check operation has only two load operations executing out of order with respect to it. Therefore, it is more expedient to re-execute both load operations rather than find out if only one load operation caused the exception and re-execute that load operation exclusively.

The compiler has to assure that the values required by the recovery code are not destroyed in the main program before the Store-Check instruction associated with the recovery code completes successfully.

The Hardware Components and Operation of the Overall System After Compilation

Figure 9A:
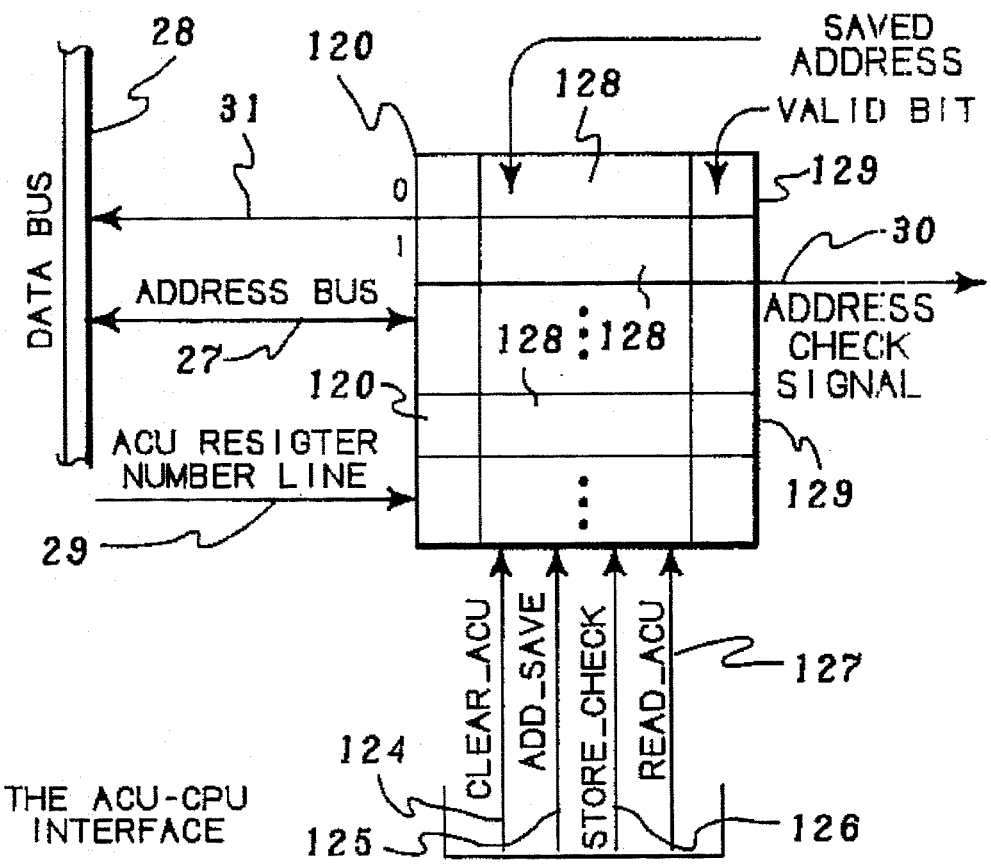
FIG. 9A is a diagram showing the interface between the ACU and the CPU of the present invention.

FIG. 7 depicts the overall computer system and its basic elements in more detail than FIG. 1. The processor, or CPU 34, has been broken out into three of its constituent elements, the CU or Control Unit 53, the ALU or Arithmetic and Logic Unit 50 and the Register File 52. The other two major units of the computer system, the ACU 22 and the Memory 23 are depicted with more details regarding the connecting circuitry. The ACU 22 is connected to the address bus 27 by line 74 through which it can receive the memory address of a load operation. ACU control lines 26 run from the CU 53 to ACU 22. Referring to FIG. 9A, a schematic depiction of the ACU-CPU interface, it will be seen that there are four separate control lines, a line 124 for the Clear-ACU instruction, a line 125 for the Load-Save instruction, a line 126 for the Store-Check instruction and a line 127 for the Read-ACU instruction. Referring back to FIG. 7, the address check signal line 30 runs from the ACU 22 to the CU 53. This is the line over which a signal would be sent if an address assigned to a store operation is identical to an address of a Load-Save operation contained within the ACU 22. Finally, there is the ACU buffer number line 29 which connects the CU 53 to the ACU 22. It is over this line that the CU 53 notifies the ACU 22 in which register to save an address.

The Memory 23 is controlled by CU 53 through control line 25 and activated when needed. The memory unit 23 is connected by a bi-directional connector 68 with the data bus 28. The bi-directional connector 68 connects the data bus 28 into memory data register 57. Additionally, the address bus 27 is connected to the memory 23 through line 69 which eventually connects to the memory address register 58. Thus, when the CU 53 wants to access a location in memory 23, it would send an activating signal over the control line 25 and simultaneously therewith send over the address bus 27 and through connector 69 the address of the particular data storage location which is to be accessed. The normal decoding operation would occur and the information requested would then be sent out on line 68 to the data bus 28 and on to either the register file 52 or to the instruction register 54 in the CU 53. Line 31 connects the ACU to the Data BUS 28. When a Read-ACU command is executed, the addresses in the ACU are sent to the memory over line 31 to the Data BUS 28, then into the memory 23 over line 68.

Within the CU 53 are two smaller sub units, the Instruction Register (IR) 54 and the Program Counter (PC) 55. The instruction register 54 and the program counter 55 would work in tandem; the program counter would send out on line 70 and over the address bus 27 to the memory 23 the address of the next instruction. The instruction itself would be transmitted back to the control unit along the data bus 28 on to line 71 and into the instruction register 54. This would obviously provide the necessary instructions to the CU 53 in their proper sequence.

The actual data processing would occur at the ALU 50. The operands on which the ALU 50 is working would have been placed in the register file 52 and made available for the ALU 50 as needed. When requested, the operands would be sent to the ALU 50 from the register file 52 over lines 73. The appropriate operation would be performed on the operands by the ALU depending on the instructions sent over the control line 25 from the CU 53. Upon completion of that operation, the result would be transmitted back to the register file 52 over line 72.

To begin operation the compiled program prepared by the compiler in accordance with the precepts of this invention would be loaded into memory 23 of the computer. This would be at the start position 105 in the flow chart of FIGS. 8A–8B. The computer then would commence execution of the program block 106, FIGS. 8A–8B. While the computer is executing the program, it will encounter from time to time, a Load-Save Command, see block 107 of FIGS. 8A–8B. When it encounters such a command, it would complete the normal load operation such as load the appropriate operand from memory 23, FIG. 7, into the appropriate register of the register file 52 of FIG. 7. It would then take the additional step of saving the address of memory 23 from which the operand came into the appropriate register in the ACU, Step 116, FIGS. 8A–8B. Since a specific ACU register number was assigned at the time the program was compiled, part of the process of saving the address to the ACU 22, FIG. 7, would be sending by the CU 53, over the ACU buffer number line 29, the number of the ACU register into which the address is to be saved. That number would be decoded by the ACU 22 and the appropriate register would be activated to enable the register to accept the address. At the same time, the valid bit of that register would be made valid. This particular aspect will be described in further detail below. Suffice it to say at this time that the valid bit could be a one bit memory position associated with the register which by either a high or low state could indicate whether the address is still relevant and should be checked or whether it is no longer valid and in effect cleared.

Figure 8A:
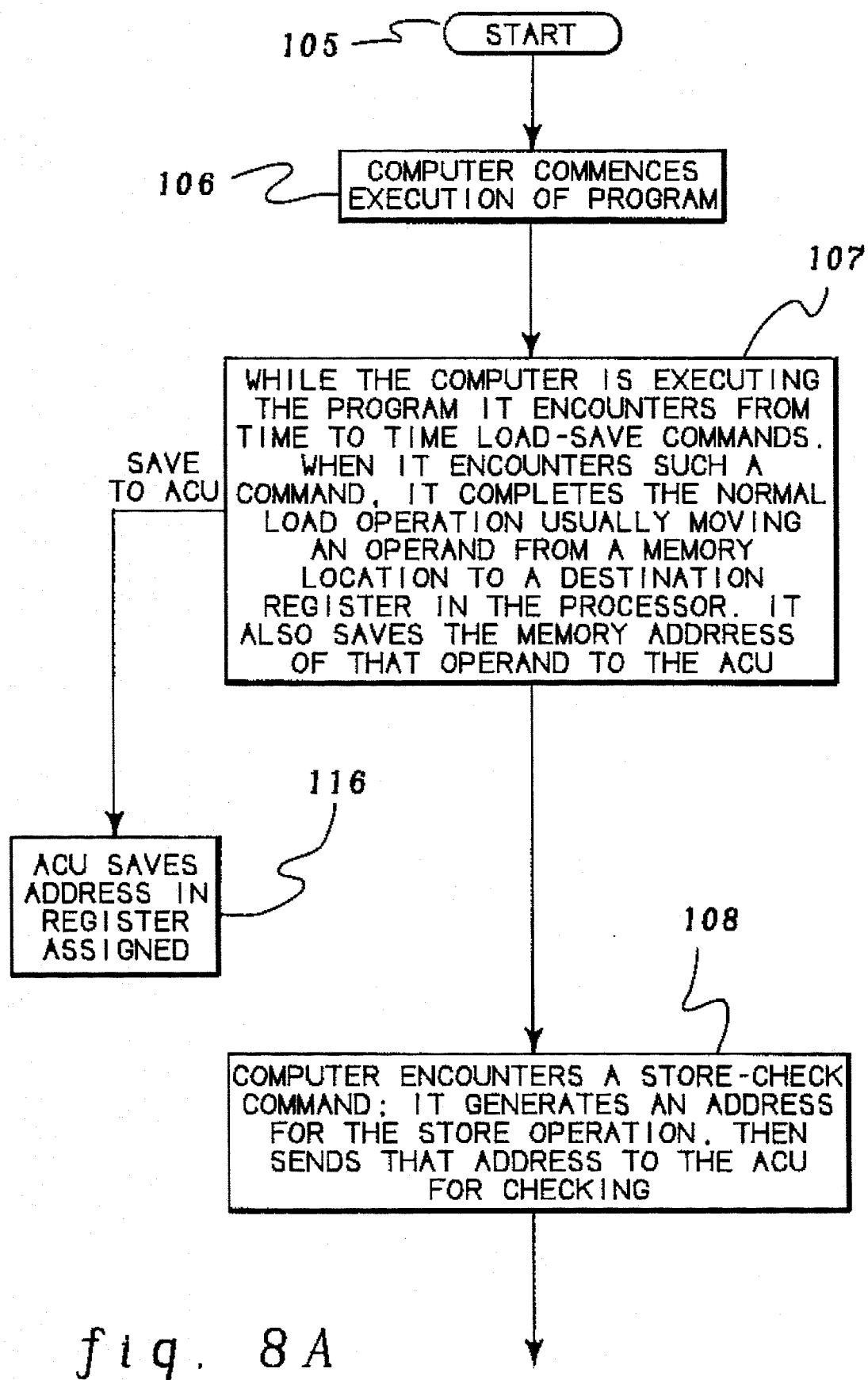
FIGS. 8A–8B is a flow chart depicting processor execution of a compiled computer program in accordance with the present invention.
Figure 8B:
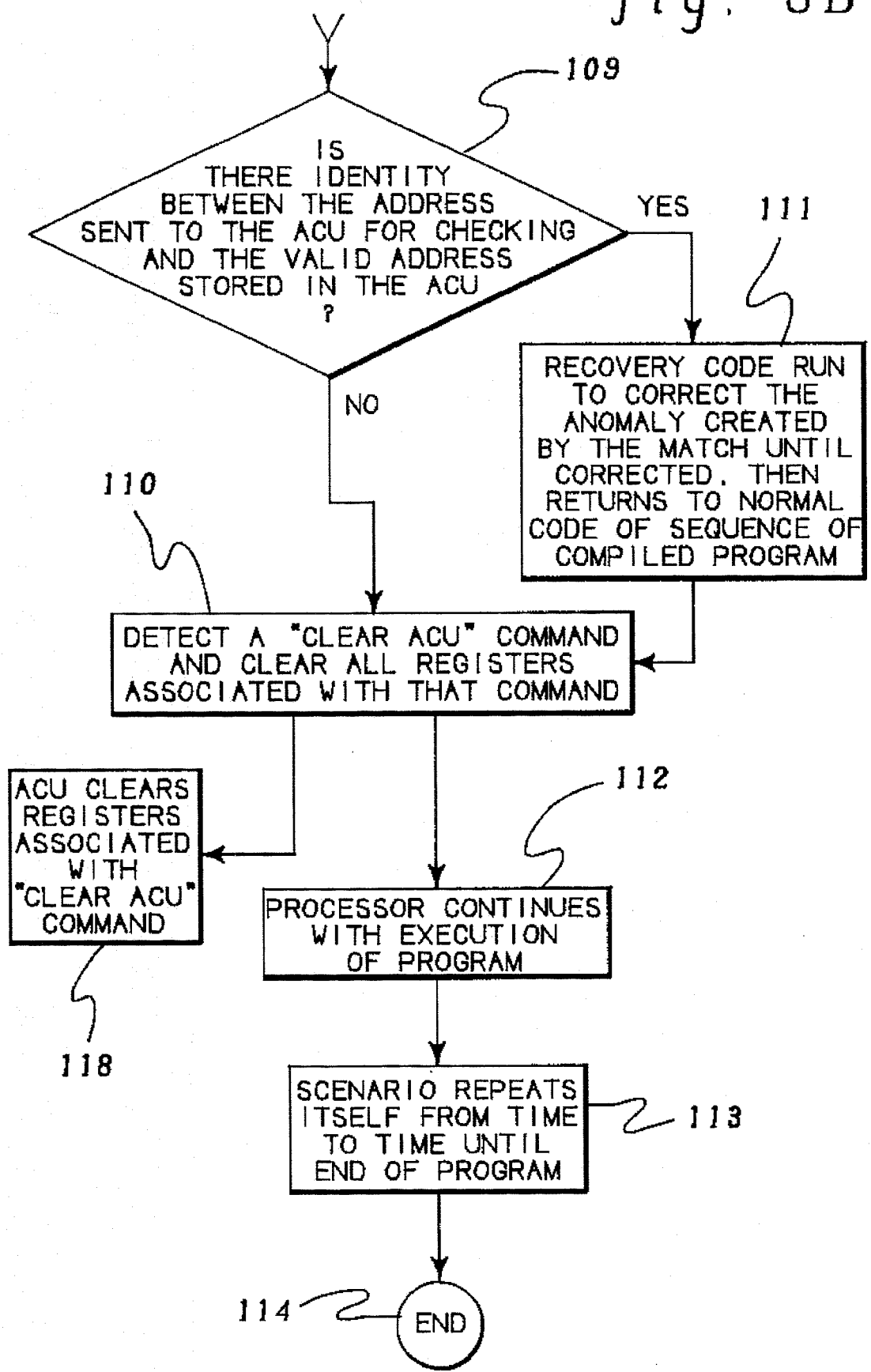

As the computer continues execution of the program, at some points it encounters Store-Check commands, block 108, FIGS. 8A–8B. Upon encountering a Store-Check command, the CU 53, FIG. 7, would send the appropriate signal over the ACU control line 26 to the ACU 22. This would be an individual control line and is depicted at 126, in FIG. 9A. The address generated during execution of the Store-Check instruction is sent to the ACU. This address would then be checked against all uncleared addresses saved in the ACU, block 117, FIGS. 8A–8B. If the address assigned for the store operation is not identical to any of the addresses of the load operations, which are valid and saved in the ACU, there would be no signal generated by the ACU, block 110, FIGS. 8A–8B. Consequently, the program would continue to be executed by the computer in sequence block 112, FIGS. 8A–8B.

However, if there is a match between the address of the store operation and a valid address being saved in the ACU, then a signal would be generated by the ACU, block 109, FIGS. 8A–8B, and sent to the CU 53 over line 30, FIG. 7.

Whether or not there is an address match and a signal is generated or there is no match and no signal generated by the ACU, there would be a subsequent instruction sent from the CU to the ACU, namely the Clear-ACU instruction, block 110, FIGS. 8A–8B. This Clear-ACU instruction would provide for the clearing of all registers which do not have to be checked against any additional Store-Check commands, block 118, FIGS. 8A–8B.

Returning now to the response of the CU upon receiving a positive address check signal over line 30, FIG. 7, the CU would not complete the store operation and would abort it. As shown at 111, FIGS. 8A–8B, the CU would then run the recovery sequence previously prepared by the compiler. The purpose of the recovery sequence is to recover from the error created by the identity between the addresses. The recovery program in a preferred embodiment of the present invention re-executes the aborted store operation, then re-executes the load operation plus any operations which follow the load operation in an unoptimized form of the program, depend on the load operation, and were moved ahead of the store operation as a result of optimization. At that point, the recovery sequence would end and the computer would recommence the execution of the main sequence of the program as compiled and optimized, immediately after the interrupting Store-Check instruction.

This scenario would repeat itself from time to time as the program is run and an error or anomaly occurs, block 113, FIGS. 8A–8B.

The Address Compare Unit

As described above, part of the system contains a special device called the addressable compare unit (ACU) that works in conjunction with the new instruction set, the improved CPU and other parts of the system. This unique ACU device serves a very specific and important function in this system. This new device saves the addresses of operands fetched by out of sequence loads on the execution of a Load-Save command. It then, upon the execution of a Save-Check command, checks the address sent to it with the addresses it has saved. As previously noted, if there is a match between a saved address and the address sent for checking during the execution of a Store-Check instruction, the ACU device sends a signal to the CPU over the above described Address-Check signal line. Finally, the ACU device then clears any addresses which it has saved which are no longer needed for checking.

The importance of the ACU is that it removes from the CPU the burden of having to save, store and check for the possibility of an anomaly due to the identity between an address generated by a store operation and an address saved by a load operation, that load operation having been moved ahead of the store operation during program compilation. By assigning this task to a device separate from the processor, it allows the processor to operate in a more efficient and expeditious manner. The processor is not designed to conduct such operations and, as previously noted, can only do it in a very inefficient manner.

The preferred embodiment of the ACU uses an associative memory. FIG. 9A illustrates the ACU/CPU interface. Data in the ACU is accessed by the data bus 28 through connector 31 and data is sent to the ACU on address bus 27. ACU Register Number Line 29 is attached to the ACU and selects the location within the ACU. Through Address Check Signal Line 30 the ACU signals the CPU of any anomaly which has arisen during a Store-Check operation. In the embodiment described herein, the ACU is controlled by four separate control lines coming from the control unit of the CPU. These are the Clear-ACU line (124), Load-Save line (125), Store-Check line (126) and Read ACU line (127). However, once the purpose of the above described preferred embodiment is understood, those familiar with the art will know there are other ways to implement the concepts described without departing from the concepts of the present invention.

The ACU registers or entries where the addresses are saved are depicted at 128. Attached to each such register is a valid bit 129 which will be discussed at length below. Finally, associated with each register or entry 128 is a control port 120. The control ports actually control access to and from the registers and respond to the control signals sent over the various control lines. One detailed configuration of how this control port could be designed in a preferred embodiment is illustrated in FIG. 10; this will be discussed at length below.

Figure 9B:
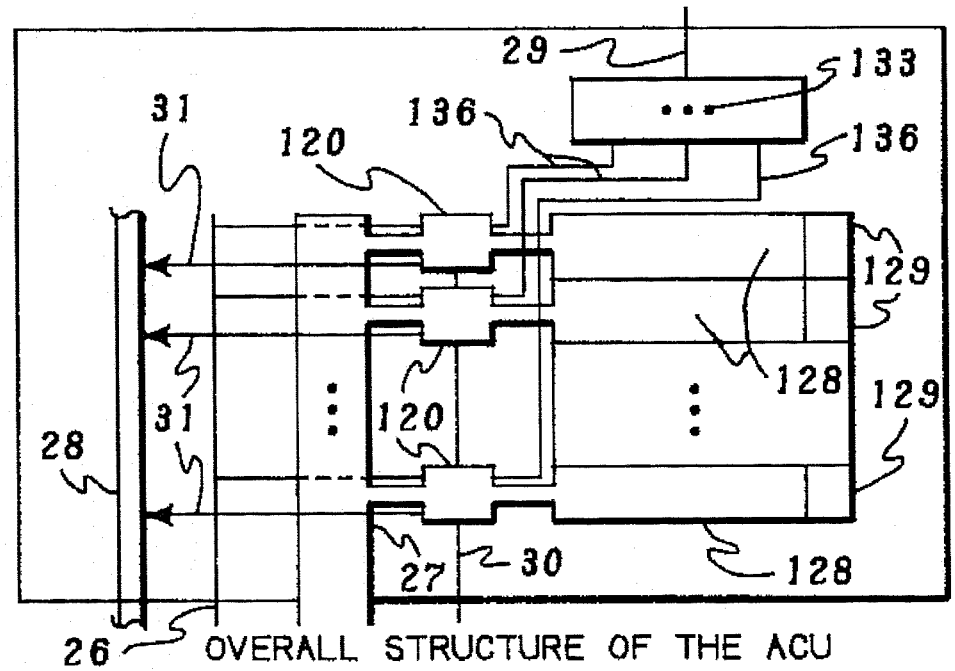
FIG. 9B portrays the overall structure of an ACU.

FIG. 9B is a basic diagram of one possible preferred embodiment of the ACU, with its most basic elements and connections illustrated. The registers 128, into which the addresses of the out of sequence loads are saved, could in the preferred embodiment, number anywhere from 16 to 64. However, the number of registers could be more or less. To each separate register 128 there is attached a valid bit location 129. The valid bit location 129 would be the place the system would look to determine whether or not the address contained within the attached register is relevant and should be checked, or is not relevant and the register is available to receive a new address to be saved. In the preferred embodiment, the valid bit 129 would be high or contain a binary one if the address saved in the register 128 therein was relevant and should be checked. On the other hand the valid bit location 129 would contain a low or a binary zero, indicating that the information contained in the register is irrelevant and devoid of an address that has to be compared and is available for use. The valid bit would then be "low" until an address of an out of sequence load is saved during a Load-Save operation and then it would go "high". When the system determines that it no longer needs to continue comparing this address, the Clear-ACU signal would in effect change the valid bit from a one to a zero, effectively clearing the register. Each register 128, FIG. 9B would be controlled by its own separate port 120. FIG. 10 illustrates within the dotted lines, one way the port would be configured to control both the register and valid bit location. The control port, as depicted in FIG. 10, will be discussed in more detail below.

Returning to FIG. 9B, the address bus 27 of the system connects to the registers 128 through the control ports 120. Access of the address bus 27 to the registers 128 is controlled by the control port 120 of each register. This allows the system to transfer the addresses to be saved to the registers 128 in the ACU. Data bus 28 and its connection 31 from the ACU allow the system to retrieve addresses saved in ACU registers 128 if and when the computer so desires. The control ports 120 are in turn controlled and activated by an address decoder 133. The address decoder 133 receives the register number of the register to be accessed over its buffer number line 29 from the computer. The register number, when it is received by the address decoder 133 over the buffer number line 29, is decoded and then a signal is sent over the particular control line 136 connecting the address decoder 133 to the various control ports to activate the specific control port 120 of the register 128 to be accessed. This signal activates and tells that particular port 120 that information will be going into or coming out of the register it controls. The control lines 26 are the means by which each port 120 is instructed as to what operation is to be conducted, whether it be a Load-Save, Store-Check, Clear-ACU or Read-ACU. If during a Store-Check operation the address assigned to the store operation is determined to be identical to one of the address stored in the registers of the ACU 120, a signal will be sent to the processor over address check signal line 30.

Figure 10:
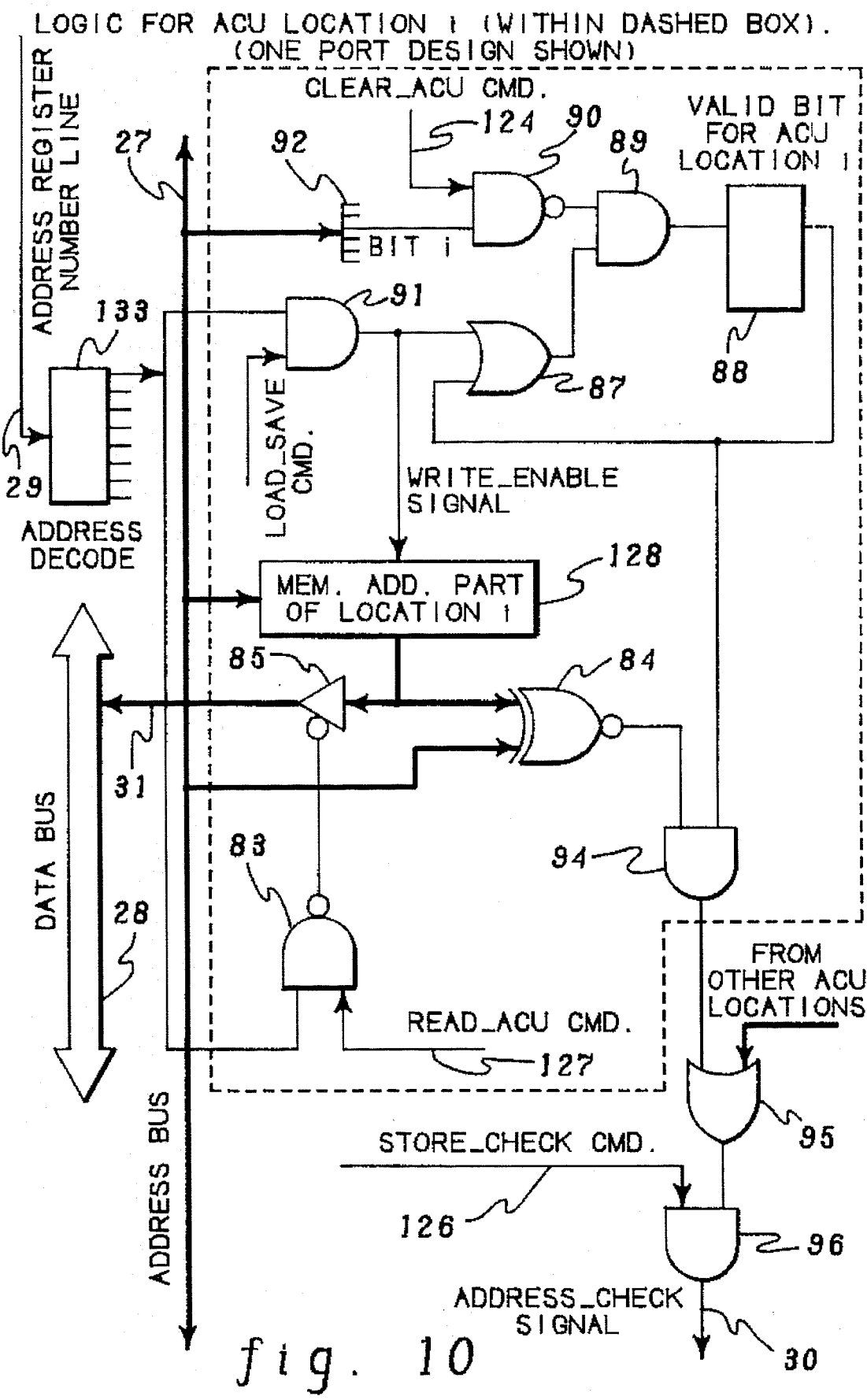
FIG. 10 is a logic diagram of one of the ports which controls the memory buffers in the ACU, together with some connecting circuitry.

The hardware implementation of the control port, as it could be done in the preferred embodiment, is depicted in FIG. 10. The hardware logic shown inside the dashed box, FIG. 10, is replicated for each register or entry of the ACU table and is designated a control port.

The term "table" is being used synonymously with buffer and they both refer collectively to all of the memory locations in the ACU where an address of an out of sequence load operation could be saved. The terms "register" and "entry" are also being used synonymously and they refer to each individual memory location where an address saved by a load operation is stored in the ACU.

Referring to FIG. 10, when the processor executes a Load-Save command, the memory address to be saved is placed on address bus 27; the register number or bit of the ACU table being written into is placed on the buffer number line 29; and the Load-Save command signal which is an input to the AND gate 91, is asserted high by the control unit of the processor. The content of the buffer number line 29 is decoded by the address decode logic 133 to produce a logical high signal on one of its outputs which is connected to the second input of the AND gate 91 of the ACU register specified by the address on the buffer number line 29. A logical low signal is produced on other outputs of the address decode unit 133 and delivered to the inputs of "and" gates 91 in ACU registers not selected by the buffer number line 29.

With the two inputs of the AND gate 91 being as defined above, its output is high for only the ACU register selected by buffer number line 29, and only when the Load-Save command signal is asserted. The output of AND gate 91 is used as a write enable signal to store the contents of memory address bus 27 into register 128 of the selected ACU register when the Load-Save command is asserted. The "flip-flop" 88, corresponding to valid bit 129, in each ACU register is used to indicate whether register 128 contains a valid load address which must be compared with the address broadcasted on address bus 27 during a Store-Check instruction. The actual comparison of the contents of register 128 and the address on bus 27 is performed in every machine cycle by XNOR gate 84 and if these two match, bit for bit, and "flip-flop" 88 indicates that the contents of register 128 are valid, then a high signal is asserted at the input of OR gate 95 by the AND gate 94. If either the match between the address on line 27 and the contents of register 128 does not occur, or if the contents of register 128 are indicated as being invalid by "flip-flop" 88, then the input to "or" gate 95 from that ACU entry remains low.

The output of OR gate 95 will be high if any of the valid ACU entries matches with the address broadcast on bus 27, and this output is applied to one of the inputs of AND gate 96. When the processor is executing a Store-Check command, it asserts line 126 as logical high and this forms the second input for the AND gate 96. The output of the AND gate 96 is the Address-Check signal on line 30 which is fed back to the processor. Because of the operation of devices 84, 94, 95, 96 and 126, the Address-Check signal on line 30 is asserted high only when the processor is executing a Store-Check command and one of the valid ACU entries match the address broadcast by the processor on address bus 27.

State transitions of the valid bit 129 are controlled by the NAND gate 90, AND gate 89 and OR gate 87. By interconnecting them in the manner shown in FIG. 10, the valid bit 129 of an ACU register will be a logical high in a given cycle if it was high in the previous cycle or if a Load-Save command stored an address into that entry in the previous cycle, or if it was high in the previous cycle and a Clear-ACU command was not executed in the previous cycle to clear the valid bit to this ACU register. In other words, the valid bit, when it is off, stays off until it is turned on by the Load-Save command and once it is on, it says on until it is turned off by a Clear-ACU command.

The Load-Save command can affect the valid bit of only one ACU entry in a given cycle, the entry selected by the buffer number line 29. However, the Clear-ACU command can clear the valid bit of several ACU entries in a given cycle. Device 92 is a straight forward mapping of bits from the address bus 27 to ACU table entries. When the number of entries in the ACU table are less than the number of bits on the address bus 27, one word is transmitted over the address bus with the Clear-ACU command and different bits on the address bus control different ACU table entries.

As noted before, each Clear-ACU command has included with it the register or buffer number or numbers of the registers to be cleared. The register or buffer numbers correspond to a bit position in a word or words ranging from the least significant bit to the most significant bit. This word or words are sent over the Address Bus 27 during a Clear-ACU operation. The number for each register would correspond to the bit map 92 and inform the ACU which registers to clear.

When the number of ACU table entries is greater than the number of bits on the address bus, multiple words are transferred over the address bus with the Clear-ACU command and a device 92 associated with each ACU memory location decodes the information and selects the valid bits from the word transferred over the address bus in a pre-designated cycle.

The computer system of the present invention has the ability to be used in a multiprogramming or multitasking environment. It has the capability of allowing the processor to execute one program, make use of the ACU and, then upon being interrupted and requested to execute another program, the processor, as part of it's step of saving the states of its register so that it can return to execution of that particular program at a later time, also sends signals, namely the Read-ACU signal to the ACU, enabling it to save the address in its ACU registers to another location in memory. The computer would then execute the new program or work on the new task which it has been assigned. When it either completes that task or is interrupted and proceeds to another program, it would do the same. Subsequently, it would eventually return to the original program it was working on. At that time, not only would the registers of the processor be restored to their state at the time of the original interrupt, but also the registers or entries of the ACU would be restored to the state they were in at the time they received the original Read-ACU instruction. Thus, this would allow the system be used in a multiprogramming or multitasking environment for several different programs or applications.

Referring once more to FIG. 10, when the processor executes a Read-ACU command, it asserts the Read-ACU command line 127 which is applied to one of the inputs of NAND gate 83. The processor also places the address of the ACU register it wants to read on buffer number line 29 which is decoded by Decode Unit 133 which then applies a high signal to the second input of the NAND gate 83 in the ACU entry or registers being read and a low signal to NAND gate 83 in other ACU entries or registers. As a result, the output of the NAND gate 83 is low in the selected ACU register and causes the contents of register 128 in that entry to be transferred through gate 85 over line 31 to the Data Bus 28. The data bus has to be a tri-state bus. Consequently, gate 85 is a tri-state gate. The address transferred from location 128 to the Data Bus is then stored in memory.

The following is an example of how the system might employ the Read-ACU instruction: the processor would send Read-ACU signals to the ACU to save the contents of the ACU to memory, when it received a request from the operating system that it wanted to run a different program or application. The signal from the operating system may be in the form of an interrupt. The processor would save the contents of its own registers to various memory locations and the contents of the ACU buffers (as noted above) using the Read-ACU instructions. The operating systems in multitasking or multiprogramming systems are capable of generating these interrupt signals. After the operating system has interrupted the execution of a program and saved to memory the contents of the ACU registers of the program being interrupted, at some point the operating system may return to the execution of this program. Restoration of the addresses to the ACU would be one of the steps taken before the computer recommences execution of the program where it was interrupted. There are any number of ways that the restoration of the ACU could be done. Certain hardware and software implementations could be created to accomplish restoration of the ACU registers to their state at the time the program was interrupted. However, a relatively easy method of restoring the ACU registers would be to move the addresses saved to memory into registers in the CPU over the data bus and then from the CPU registers along the address bus to the registers in the ACU where those addresses were stored at the time the program was interrupted. The operation could be done in part using an indirect Load-Save operation. Appropriate modifications to the interrupt handler by methods well known in the art can easily provide for this.

Figure 11:
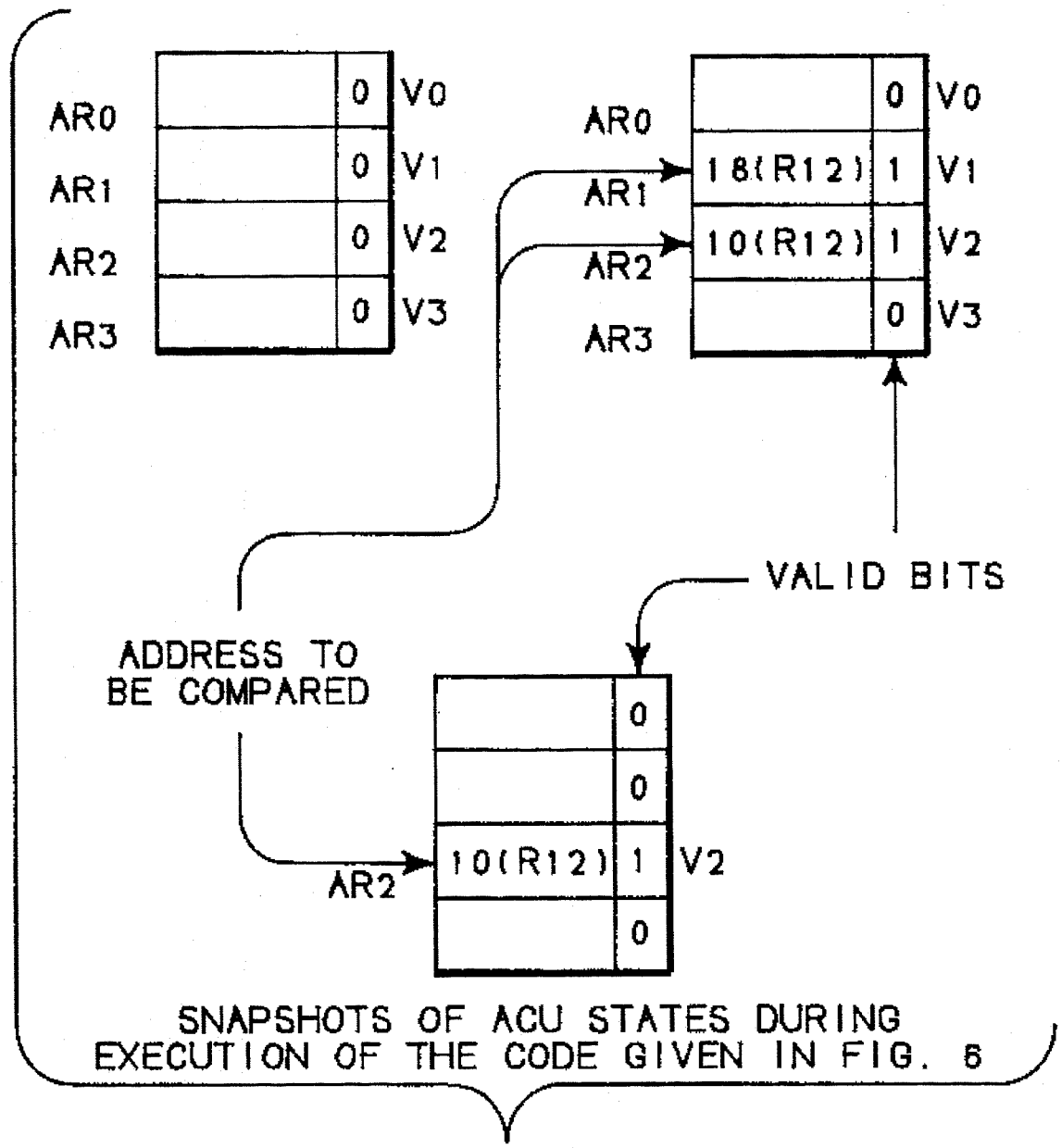
FIGS. 11A, 11B and 11C provide a representation of the states of the registers in the ACU during operation.

An example of what would occur within the registers of the ACU during the execution of a program sequence will now be described. Reference should be made to FIG. 6C and FIG. 11. At the start, all of the registers 128 of the ACU would be clear (FIG. 11A). Assuming the program sequence at FIG. 6C is executed, instruction line 1 would be the addition of R13 and R15 and would be conducted by the processor. Then the processor would execute the program instruction line 2 in FIG. 6C. This would be a Load-Save operation. At the same time it is loading the appropriate information from memory location 18 (R12), it will also be saving the memory address 18 (R12) to register AR1 in the ACU, FIG. 11B. At the same time, the valid bit V1 of register AR1, will be changed from a zero to a one. The computer then executes the next line of the program, line 3, FIG. 6C, and as part of the execution of the Load-Save instruction, it saves the address 10 (R12) to register AR2. At the same time it changes the valid bit V2 of register AR2, from a zero to a one. When the computer reaches instruction line 6 of FIG. 6C, it then executes the store operation and compares the address it used to fetch from memory the operand in CPU register R1, namely 112 (R13), with the two addresses saved in the ACU registers of the ACU as set out at FIG. 11B. In the next line of the program, line 7, FIG. 6C, the Clear-ACU instruction essentially clears register AR1 by changing the valid bit, V1 of register R2 from a one to a zero. The computer now looks at this particular buffer as being cleared or erased as depicted in FIG. 11C. It also looks upon this ACU register as one that-it can use for future saves and one that it can disregard during future Store-Check operations as long as the valid bit remains zero. The computer then executes instruction line 8 of the program, as set out at FIG. 6C. The computer accordingly checks the address generated for the store operation with the registers of the ACU. In checking, the computer see's the registers as illustrated at FIG. 11C. Namely, only register AR2 is considered to have a valid address which should be checked since register or entry AR2 has the only valid bit V2 which is a positive, or in a high state.

Application to Sophisticated Computer System

It will be readily seen by those skilled in the art that the system of the present invention has broad applications. It is not only applicable when used with a "Uniprocessor", i.e. a processor that only executes one instruction at a time, but it would also be useable in much more sophisticated systems and even in super-computers. It is ideally suited for use in a VLIW (Very Long Instruction Word) or a super-scaler computer system. A super-scaler computer is a computer in which multiple instructions are executed in every machine cycle to obtain higher execution speeds. Typically, super-scaler computers execute two or four instructions in a machine cycle and the instructions executed in one machine cycle are different types of instructions for example, integer arithmetic operations, floating point arithmetic operations, load operations or branch operations. VLIW type of computer architecture is a form in which several instructions are performed during each machine cycle. VLIW computers are typically designed to execute many more instructions in each machine cycle and multiple instructions can be of the same type. In some cases, VLIW computers handle multiple branch instructions in a single machine cycle also. Obviously, the ability to reduce memory latencies when using VLIW architecture or super-scaler computers would provide a substantial increase in efficiency and speed of execution. The system, as proposed herein, when applied to these more sophisticated architectures, would provide even greater gains in efficiency and speed. An excellent reference on compilers and the compilation process for VLIW machines is *Bulldog: A Compiler for VLIW Architectures*, J. R. Ellis, Ph.D. thesis, MIT Press, 1986.

An example of how the invention herein could be beneficially used with the operation of a sophisticated computer system will now be described. The example involves a computer system using VLIW architecture and an IBM System S370-like assembly language. This is the same assembly language used previously in the description of the programming sequence set forth in FIGS. 6A, 6B, 6C and 6D. The same original program sequence is again used and is set out at FIG. 12A. For a detailed description of each line of programming in FIG. 12A, reference should be made to the prior discussion of FIG. 6A.

In the code fragment set out at FIG. 12A, the objective is to complete execution of the code fragment as soon as possible. We will assume that the compiler has no way of knowing whether the addresses generated by adding the offsets specified in the instruction to the contents of registers R12 and R13 are equal or not. As noted, for the exemplary machine for the optimized codes, it is assumed a VLIW architecture that can execute several 370 instructions in one cycle is being used. Though, a 370-like load or store with a displacement would probably be further broken down into several one-cycle primitive operations, this particular assumption is for keeping the example simple. Operations in a VLIW instruction are executed as noted above in parallel, using the old values of registers available from previous instructions; a compiler could guarantee that they have no data dependence on each other. Store, Store-Check and Clear-ACU operations in the same instruction have the effect as if they were executed sequentially from left to right in their order of occurrence in the instruction even though they are executed in parallel by special multiport cache hardware and load operations, and read the old value of a memory location available from the previous VLIW instructions, even if there are concurrent stores in the same memory location in the same instruction. These assumptions are implementation details but are necessary for understanding the examples.

The minimum execution time that can be obtained on this code fragment by a VLIW machine without the ACU feature is set forth in FIG. 12B and described below. The compiler must assume that the line 4, FIG. 12B, namely L R2, 18 (R12) instruction can conflict with the line 3, ST R1, 112 (R13) instruction. It also must assume that the instruction on line 4 could also conflict with the instruction on line 5, ST R3, 116 (R13). It also must assume that the instruction on line 6, namely L R4, 10 (R12) could conflict with the instruction on line 5, namely ST R3, 116 (R13). Therefore, the compiler will not reorder them, resulting in the program being compiled in the form set forth in FIG. 12B. It would therefore take seven cycles for all executions even when none of the loads and stores refer to the same location in a given instance of this code execution.

However, when the ACU is built into the VLIW machine, the above mentioned code fragment can be scheduled in three cycles as shown in FIG. 12C. This schedule assumes that there are no conflicts between the loads and stores. If a conflict between the loads and stores is detected by the ACU during the execution of this three cycle code fragment, an additional five cycles will be spent in the recovery code, FIG. 12D, by the VLIW machine, plus there will be an interrupt overhead, whose extent depends upon the implementation. Therefore, if the frequency of the instances where the load and store addresses do not conflict is even moderately high, the ACU feature would significantly reduce the execution time of this code.

The recovery code set out at FIG. 12D, is similar to the one shown in FIG. 6D with the following variations: Since the machine is a VLIW machine, when a Store-Check operation in a VLIW instruction causes an address check exception, all operations in that instruction are aborted and must be executed in the recovery code. Therefore, the two Clear-ACU and the "AR" operations are repeated in the recovery code, FIG. 12D, in addition to the operations shown in FIG. 6D for instruction Store-Check R1, 112 (R13). There can be multiple Store-Check operations in the same instruction as shown in FIG. 12C, where two Store-Check operations occur in the instruction 3. Irrespective of which Store-Check operation causes the Address-Check exception, the recovery code then executed contains the operations necessary for recovering from the exception caused by both Store-Check operations. This approach is significantly simpler than generating separate recovery codes for the different Store-Check operations in the same instruction and the performance impact will be negligible.

As will be readily apparent to those versed in this art, a multiported ACU to support multiple Load-Save and Store-Check instructions in each cycle is a straight forward extension of the earlier described single ported ACU. Additional hardware will be required for implementing multiple ports.

Also, the address compare unit (ACU) could be implemented using methods other than the associative memory described in the preferred embodiment. Instead of having a comparator with each register/location, as is the case with associative memory, one could use a multi-ported register file and a comparator per read port. The number of read ports would be chosen to meet the desired performance objective. A small amount of extra hardware might then be used to make all of the comparators access all of the ACU registers in actual use without duplications. If this extra hardware is not desirable, the registers/locations could be partitioned in a static fashion among the comparators available. One could also provide multiple register sets in the ACU, allocatable to different user processes, to prevent the need for saving and restoring the ACU contents on timer interrupts in a time sharing operating system. A significantly different implementation of the ACU, also covered within the scope of this invention, is to allocate the ACU register for an address to be saved at run time, when the instruction generating the address to be saved is executed. This simplifies the implementation of the compiler, because now the compiler does not have to worry about the allocation and deallocation of the ACU registers. Then the ACU could be implemented as a hardware hash table. Furthermore, the Valid bit in the ACU could be replaced by a tag field capable of representing multiple values. A non-zero tag value would indicate a valid entry. The Load-Save command could also specify the tag value to be saved along with the address being saved. Then the Clear-ACU command could, in one of many ways, specify a range of tag values (or a set of tag values), and the entries in this range (or set) could be removed from the ACU in a single command.

The particular instructions specified in the preferred embodiment also could be modified and/or additional instructions added for better performance without violating the spirit of this invention. In the preferred embodiment, the mask for the Clear-ACU instruction is specified in the instruction itself. In some CPU designs, it will be more optimal to implement a smaller fixed size instruction which points to the mask stored in the main memory. Similarly, the Read-ACU instruction is used currently to move the contents of the ACU-register to the main memory, one instruction at a time. A vector move type instruction could be used instead to specify the transfer of all ACU registers to memory in one instruction. The performance of this instruction could be further optimized by specifying a vector-mask (in memory) which identifies the ACU registers whose contents must be saved. Similarly a vector instruction could be used to restore all the necessary registers/locations of the ACU, using a single instruction. In addition to modifying the instructions as described above, new instructions could be added. When the ACU finds a match, the knowledge of which ACU location resulted in the match might be necessary for selecting the optimal recovery sequence. The ACU could have a special register to store the address of the matching location, and the CPU could interrogate this register using a special instruction. If multiple matches occur, the address of one of the matching locations (probably the lowest) could be reported to the CPU and along with it an additional one bit signal could indicate that there are additional matching locations. If the ACU does not have such hardware support, it might be useful to have a version of the Read-ACU command which transfers the contents of a specified ACU register into a specified CPU general purpose register.

Also, the recovery mechanism mentioned in the preferred embodiment could be modified without violating the scope or spirit of the invention in many ways. For example, the CPU architecture could be modified to include an extra bit in its condition code register, which is set only by execution of a Store-Check instruction, when it results in a match in the ACU. The CPU could then use this condition code register with other ACU commands to choose the right recovery code.

While the invention has been particularly shown and described with reference to preferred embodiments thereof, it will be understood by those skilled in the art that various changes in form and details may be made therein without departing from the spirit and scope of the invention.

We claim:

1. A method for improving the execution performance of out of sequence load operations with the use of a processor and a dedicated address compare unit (ACU) for comparing a memory address against a stored set of addresses, which method comprises:
   (a) executing a compiled optimized program with the processor, said complied optimized program having a load operation identified and out of sequence ahead of a store operation, said store operation being identified and preceding said load operation in an uncompiled form of said compiled optimized program, said load operation being out of sequence ahead of said store operation in said compiled optimized program so as to optimize execution performance;
   (b) saving to the ACU during said executing step (a) an address of an operand fetched by the out of sequence load operation and comparing the saved address with an address generated by the store operation during compiled optimized program execution;
   (c) if the addresses are different, completing the store operation and continuing said executing step (a) of the compiled optimized program;
   (d) if the addresses are identical, aborting the store operation and providing for recovery of the program; and
   wherein execution of said compiled optimized program produces a same output as an execution of said program in a compiled unoptimized form having said load operation in sequence and following said store operation.

2. The method of claim 1, further including the step of clearing the saved address in the ACU after the saved address is compared with the address generated by the associated store operation.

3. The method of claim 1, wherein the step of providing for recovery of the program comprises the steps of completing the aborted store operation, then executing the load operation, and executing any operations which follow the load operation in an unoptimized form of the program, depend on the load operation and were moved ahead of the store operation as a result of the optimization.

4. The method of claim 3, further comprising the step of resuming the execution of the optimized program immediately after the aborted store operation upon completion of execution of the recovery program.

5. The method of claim 1, further including the step of providing said program having a plurality of load operations and a plurality of store operations, and wherein said steps (a), (b), (c) and (d) are repeated for each load operation of said plurality of load operations and are repeated for each store operation of said plurality of store operations.

6. The method of claim 3, further including the step of providing said program having a plurality of load operations and a plurality of store operations, and wherein said steps (a), (b), (c) and (d) are repeated for each load operation of said plurality of load operations and are repeated for each store operation of said plurality of store operations.

7. The method of claim 1, further comprising the steps of: transferring the address saved during the load operation from the ACU to a different memory location to facilitate execution of a different program, and then, at a later time, returning the transferred address to the ACU to resume execution of the compiled optimized program.

8. The method of claim 6, applied to a multi-programming environment further comprising the steps of: transferring addresses saved during load operations from original memory locations in the ACU to different memory locations to facilitate execution of a different program, and then, at a later time, returning the transferred addresses to the original memory locations in the ACU to resume execution of the compiled optimized program.

9. The method of claim 1, wherein: the step of identifying the load operation moved out of sequence comprises changing a load instruction to a load-save instruction; the step of identifying the store operation comprises changing a store instruction to a store-check instruction; the saving step is implemented in response to the load-save instruction; and said comparing step is implemented in response to the store-check instruction.

10. The method of claim 6, wherein: identifying each load operation moved out of sequence comprises changing a load instruction to a load-save instruction; identifying each store operation comprises changing a store instruction to a store-check instruction; the saving step is implemented in response to each load-save instruction; and the comparing step is implemented in response to each store-check instruction.

11. A system for improving performance of out of sequence load operations comprising:
   compiling means for during compilation and optimization of a program having a first output corresponding to an execution of a compiled unoptimized form of said program: identifying a load operation that can be moved out of sequence ahead of a store operation,
   storing the identified load operation out of sequence, ahead of said store operation in a compiled optimized program, so as to improve execution performance, and identifying the store operation before which the load operation has been moved in the compiled optimized program;

processor means for execution of the compiled optimized program to produce said first output;

dedicated means for saving during said execution of the compiled optimized program an address of an operand fetched by the load operation moved out of sequence;

dedicated means for comparing the saved address with an address generated by the store operation during said execution of the compiled optimized program;

means for completing the store operation and continuing execution of the compiled optimized program in sequence if the compared addresses are different; and means for aborting the store operation and providing for recovery of the program if the compared addresses are identical.

12. The apparatus of claim 11, further comprising means for clearing the saved address after the saved address is compared with the address assigned to the store operation.

13. The apparatus of claim 11, wherein the means for providing for recovery of the program comprises means for completing the aborted store operation, then executing the load operation, and executing any operations which follow the load operation in an unoptimized form of the program, depend on the load operation and were affected by moving the load operation ahead of the store operation as a result of the optimization of the compiled optimized program.

14. The apparatus of claim 13, further comprising means for resuming the execution of the compiled optimized program immediately after the aborted store operation upon completion of the recovery of the compiled optimized program.

15. The apparatus of claim 11, wherein said compiling means, said processor means, said dedicated means for saving, said dedicated means for comparing, said means for completing and said means for aborting further comprise means for performing a plurality of load operations and a plurality of store operations.

16. The apparatus of claim 13, wherein said compiling means, said processor means, said dedicated means for saving, said dedicated means for comparing, said means for completing and said means for aborting further comprise means for performing a plurality of load operations and a plurality of store operations.

17. The apparatus of claim 11, further comprising means for: transferring the saved address from an ACU to a different memory location to facilitate execution of a different program, and then, at a later time, returning the saved address to the ACU to resume execution of the compiled optimized program.

18. The apparatus of claim 16, further comprising means for transferring a plurality of addresses saved during the load operations from an ACU to a different memory to facilitate execution of a different program, and then, at a later time, returning the plurality of addresses to the ACU to resume execution of the compiled and optimized program.

19. The apparatus of claim 11, wherein the means for identifying the load operation moved out of sequence comprises means to change a load instruction to a load-save instruction; the means for identifying the store operation comprises means to change a store instruction to a store-check instruction; and the means for saving and the means for comparing perform these steps in response to the load-save instruction and the store-check instruction, respectively.

20. The apparatus of claim 16, wherein the means for identifying each load operation moved out of sequence comprises means for changing a load instruction to a load-save instruction; the means for identifying each store operation comprises means for changing a store instruction to a store-check instruction; and the means for saving and means for comparing perform these steps in response to each load-save operation and each store-check operation, respectively.

21. An improved apparatus comprising a programmed processor for compiling and optimizing an uncompiled computer program for execution by a processor having an address compare unit (ACU), said uncompiled computer program having a first output corresponding to an execution of a compiled unoptimized form of said uncompiled computer program, said programmed processor comprising:

means to identify and flag a load operation of said uncompiled computer program which can be moved ahead of a store operation, said store operation having preceded the load operation in said uncompiled computer program;

means to store and flag the store operation in a compiled optimized program; and means to store the identified and flagged load operation ahead of the store operation in the compiled optimized program to facilitate execution of said compiled optimized program to produce said first output, whereby during said execution of said compiled optimized program by said processor having said ACU, said store operation facilitates a comparison by said ACU of an address referenced by said load operation with an address referenced by said store operation.

22. An improved compiler as claimed in claim 21, further comprising means for inserting a recovery sequence in the compiled optimized program to be used during execution of the compiled optimized program if an address of an operand fetched by the load operation is identical to an address generated by the store operation during execution of the compiled optimized program.

23. The improved compiler of claim 21, further comprising means for adding to the compiled optimized program a clear instruction to clear an address saved during the load operation after comparison of the saved address with an address generated by the store operation during execution of the compiled optimized program.

24. The improved compiler of claim 21, wherein the means to flag the load operation comprises means for changing the load operation to a load-save operation.

25. The improved compiler of claim 21, wherein the means to flag the store operation comprises means to change the store operation to a store-check operation.

26. The improved compiler of claim 21, wherein a plurality of load operations which can be moved ahead of store operations are identified, flagged and so moved in the compiled optimized program, and a plurality of store operations before which the load operations are moved are flagged in the compiled optimized program.

27. The improved compiler of claim 26, wherein the means to flag load operations moved ahead of store operations comprises means for changing a load instruction for each load operation to a load-save instruction.

28. The improved compiler of claim 26, wherein the means to flag each store operation which has a load operation moved ahead of it comprises means to change a store instruction related to each store operation to a store-check instruction.

29. The improved compiler of claim 23 further comprising means for adding, during compilation of the program, the clear instruction to a target of a branch operation if the out of sequence load has been moved ahead of said branch operation.

30. A method for optimizing a computer program during program compilation with a programmed processor, said computer program for execution by a processor having an address compare unit (ACU), said computer program having a first output corresponding to an execution of a compiled unoptimized form of said computer program, said method comprising:

identifying and flagging a load operation which can be moved ahead of a store operation, said store operation having preceded the load operation in an uncompiled form of the program;

flagging the store operation; and storing said identified and flagged load operation ahead of the store operation in a compiled optimized program to facilitate execution of said compiled optimized program to produce said first output, whereby during said execution of said compiled optimized program by said processor having said ACU, said store operation facilitates a comparison by said ACU of an address referenced by said load operation with an address referenced by said store operation.

31. The method of claim 30, further comprising the step of inserting a recovery sequence in the compiled optimized program, during compilation of the computer program to be used during execution of the compiled optimized program if an address of an operand fetched by the load operation is identical to an address generated by the store operation during execution of the compiled optimized program.

32. The method of claim 30, further comprising the step of adding to the compiled optimized program during compilation an instruction to clear any address saved during the load operation after comparison of that saved address with an address assigned to the associated store operation during execution of the compiled optimized program.

33. The method of claim 30, wherein the step of flagging the load operation is accomplished by changing a load instruction to a load-save instruction.

34. The method of claim 30, wherein the step of flagging the store operation comprises changing a store instruction to a store-check instruction.

35. The method of claim 30 further comprising the steps of identifying and flagging a plurality of load operations which can be moved ahead of a plurality of store operations and so moving the plurality of load operations and flagging the plurality of store operations before which the plurality of load operations have been moved in the compiled optimized program.

36. The method of claim 35, wherein the step of flagging load operations moved ahead of store operations comprises changing a load instruction to a load-save instruction for each load moved ahead of a store operation.

37. The method of claim 35, wherein the step of flagging said store operations comprises changing a store instruction to a store-check instruction for each associated store operation.

38. The method of claim 32 further comprising the step of adding, during compilation of the program, the clear instruction to a target of a branch instruction if the load operation has been moved ahead of said branch operation.

39. A system for performing out of sequence load operations of a compiled optimized program, said compiled optimized program having a flagged load operation moved out of sequence ahead of a flagged store operation, said system comprising:

a processor and associated address compare unit (ACU);

the processor comprising: means for executing the compiled program having said flagged load operation moved out of sequence ahead of said flagged store operation, means for recognizing the flagged load operation and saving to the ACU an address of an operand fetched by the load operation, and means for recognizing the flagged store operation and generating an address by the store operation;

the ACU comprising means to compare the saved address with the address generated by the store operation; and wherein the ACU facilitates said executing said compiled optimized program to produce a same output as an executing of a compiled unoptimized form of said compiled optimized program, said compiled unoptimized form having said load operation in sequence and following said store operation.

40. The system of claim 39, wherein the ACU further comprises means for sending a signal to the processor when the address saved during the out of sequence load operation is identical to the address generated by the store operation; and the processor further comprises means for implementing a recovery routine in response to said signal.

41. The system of claim 39, further comprising means to clear the address saved during the load operation after it has been compared with the address generated by the associated store operation.

42. The system of claim 39, wherein the flagged load operation comprises a load-save instruction and the means for recognizing and saving to the ACU the address of an operand fetched by the load operation comprises means for executing the load-save instruction.

43. The system of claim 39, wherein the flagged store operation comprises a store-check instruction and the means for recognizing the store operation and comparing the address generated by the store operation with the address saved during the load operation comprises means for executing the store-check instruction.

44. A method for performing, on a processor with a dedicated address compare unit, out of sequence load operations of a compiled optimized program, said compiled optimized program having a load operation moved out of sequence ahead of a store operation in said compiled optimized program, said method comprising the steps of:

executing the compiled optimized program including executing the out of sequence load operation on the processor; during said executing: recognizing the load operation and saving an address of an operand fetched by the load operation in said dedicated address compare unit and recognizing the store operation and generating an address by the store operation;

comparing in said dedicated address compare unit the saved address with the address generated by the store operation;

implementing a recovery routine when the comparing step indicates that the saved address is identical to the address generated by the store operation, said recovery routine including the step of resuming said executing the compiled optimized program and providing for proper executing of said load operation; and wherein said executing said compiled optimized program produces a same output as an executing of a compiled unoptimized form of said compiled optimized program, said compiled and unoptimized form having said load operation in sequence and following said store operation.

45. The method of claim 44, further comprising the step of clearing the address saved during the load operation after it has been compared with the address generated by the store operation.

46. The method of claim 44, wherein the step of recognizing and saving the address of the operand fetched by the load operation is accomplished by execution of a load-save instruction.

47. The method of claim 44, wherein the steps of recognizing the store operation and comparing the address generated thereby with the address saved during the load operation comprises execution of a store-check instruction.

48. The method of claim 44, wherein the recited steps are repeated for each load operation of a plurality of load operations moved out of sequence and are repeated for each store operation of a plurality of store operations.

49. An address compare unit for use in a system for performing out of sequence load operations during execution of a compiled and optimized program, said compiled and optimized program having a load operation moved out of sequence ahead of a store operation, said address compare unit comprising:

means for saving an address of an operand fetched by the load operation, said load operation being stored out of sequence ahead of the store operation in the compiled and optimized program;

means for comparing the saved address with an address generated by the store operation during execution of the compiled and optimized program;

means for generating a signal when the compared saved address is identical to the address generated by the store operation; and wherein said address compare unit facilitates execution of said compiled and optimized program producing a same output as an execution of a compiled and unoptimized form of said compiled and optimized program, said compiled and unoptimized form having said load operation in sequence and following said store operation.

50. The apparatus of claim 49, further comprising means for clearing the saved address after comparison with the address generated by the store operation.

51. The apparatus of claim 49, further comprising means for transferring the saved address to an external memory location prior to execution of a different program and means for recalling the transferred address from the external memory location prior to resumption of execution of the compiled and optimized program.

52. The apparatus of claim 49, wherein the means for saving comprises means for saving respective addresses of a plurality of operands fetched by a plurality of out of sequence load operations; and the means for comparing comprises means for comparing said respective addresses with addresses generated by any store operations.

53. The address compare unit of claim 50 wherein the means for saving, clearing, comparing and generating a signal comprises a memory register, a valid bit location, and a control port which work together as a unit.

54. The address compare unit of claim 53 wherein there are a plurality of such units.

55. The address compare unit of claim 54 further comprising a decoder activating the units.

56. The apparatus of claim 52 wherein the means for saving comprises a plurality of memory registers; the means for clearing comprises a plurality of valid bit locations; and the means for transferring, comparing and generating a signal comprises a plurality of control ports.

57. The apparatus of claim 56 wherein the plurality of memory registers, valid bits and control units are grouped together into units comprising one memory register, one valid bit and one control port.

58. An improved processor having an instruction set including a load-save instruction and a store-check instruction comprising:

means for implementing the load-save instruction by performing a load operation and saving an address of an operand fetched by the load operation;

means for implementing the store-check instruction by generating an address for the store operation and initiating comparison of the generated address with the saved address;

dedicated means for comparing the generated address with the saved address; and means for running a recovery sequence when said comparison indicates the generated address is identical to the saved address, wherein said recovery sequence is generated during compilation and optimization of a computer program containing said load-save instruction and said store-check instruction.

59. The improved processor of claim 58 further comprising means for running of a recovery sequence when said comparison indicates the generated address of the store operation is identical to the address saved during the load operation.

60. The apparatus of claim 58 further comprising means for initiating transfer and subsequent recall of the address saved during the load operation to accommodate a multiprogramming application.

* * * * *